(12) United States Patent
Myrfield, Jr.

(10) Patent No.: US 10,369,643 B2
(45) Date of Patent: Aug. 6, 2019

(54) PROCESS SYSTEMS AND METHODS FOR CUTTING TRUE WITH A BANDSAW

(71) Applicant: Warren L. Myrfield, Jr., Olympia, WA (US)

(72) Inventor: Warren L. Myrfield, Jr., Olympia, WA (US)

( * ) Notice: Subject to any disclaimer, the term of this patent is extended or adjusted under 35 U.S.C. 154(b) by 0 days.

(21) Appl. No.: 15/174,651

(22) Filed: Jun. 6, 2016

(65) Prior Publication Data

US 2016/0354848 A1 Dec. 8, 2016

Related U.S. Application Data

(60) Provisional application No. 62/172,089, filed on Jun. 6, 2015, provisional application No. 62/323,617, filed on Apr. 15, 2016.

(51) Int. Cl.

| | | |
|---|---|---|
| *B23D 55/04* | (2006.01) |
| *B23D 59/00* | (2006.01) |
| *B27B 13/08* | (2006.01) |
| *B27B 15/04* | (2006.01) |
| *B27B 31/06* | (2006.01) |
| *B23D 55/08* | (2006.01) |

(52) U.S. Cl.
CPC ......... *B23D 59/002* (2013.01); *B23D 55/046* (2013.01); *B23D 55/084* (2013.01); *B27B 13/08* (2013.01); *B27B 15/04* (2013.01); *B27B 31/06* (2013.01)

(58) Field of Classification Search
CPC .. B23D 59/002; B23D 55/046; B23D 55/084; B23D 36/00; B23D 55/088; B27B 13/08; B27B 15/04; Y10T 83/141; Y10T 83/148

USPC .................... 73/849, 818, 851, 783, 862.381
See application file for complete search history.

(56) References Cited

U.S. PATENT DOCUMENTS 2,815,561 A * 12/1957 Crane ................... B23D 36/00
83/367
5,176,055 A * 1/1993 Wijesinghe ............ B23D 55/06
83/72

(Continued)

OTHER PUBLICATIONS

Lion (Lion precision, Deflection Measurement With Capacitive and Eddy-Current Sensors, 2014, http://www.lionprecision.com/tech-library/appnotes/general-0024-deflection-measurement.html?gclid=COnn6trWz9QCFcaNswodKXQLqQ).*

*Primary Examiner* — Kenneth E Peterson
*Assistant Examiner* — Liang Dong
(74) *Attorney, Agent, or Firm* — Mersenne Law

(57) ABSTRACT

Systems and methods for improved bandsaw process control and throughput, in which a sawblade of a bandsaw contacts a bottom sawguide mounted in a bottom guide holder, the bottom guide holder frame having a "flexural member" that transmits forces on the sawguide to a force transducer associated with the flexural member. Workpiece-related forces include deflection forces, both lateral and torsional, and saw resistance forces on the bottom sawguide. An object of the invention is to establish a true cut condition when pre-straining the sawblade and a process control loop whereby the true cut condition is restored in near real time while cutting a workpiece. The combination of a force sensing guide holder and a process control loop synergically improves target lumber size control and maximizes log value, while also increasing throughput by reducing both overfeed and underfeed.

10 Claims, 23 Drawing Sheets

(56) References Cited

U.S. PATENT DOCUMENTS

| | | | | |
|---|---|---|---|---|
| 5,694,821 A | * | 12/1997 | Smith | B23D 59/002 700/188 |
| 7,308,921 B1 | * | 12/2007 | Brewer, Sr. | B27B 15/02 144/3.1 |
| 2009/0126549 A1 | * | 5/2009 | Dietz | B23D 55/084 83/817 |
| 2010/0024226 A1 | * | 2/2010 | Kaiser | B23D 49/162 30/392 |
| 2011/0132169 A1 | * | 6/2011 | Kapoor | B26D 1/0006 83/875 |
| 2013/0194555 A1 | * | 8/2013 | Davis | G02B 26/105 353/98 |
| 2013/0319135 A1 | * | 12/2013 | Okada | G01L 1/14 73/862.043 |
| 2015/0128778 A1 | * | 5/2015 | Jeng | B23D 55/06 83/72 |

* cited by examiner

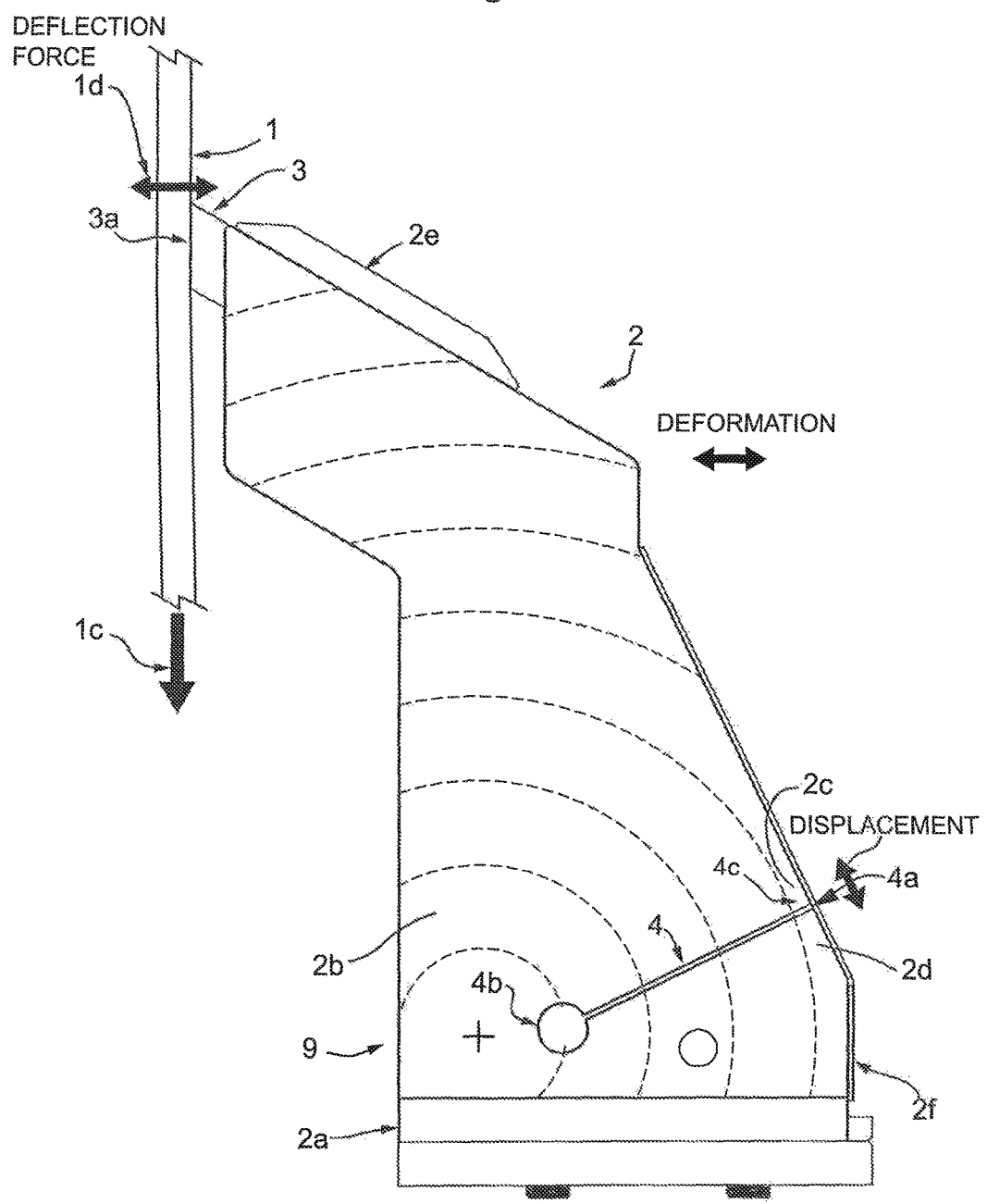

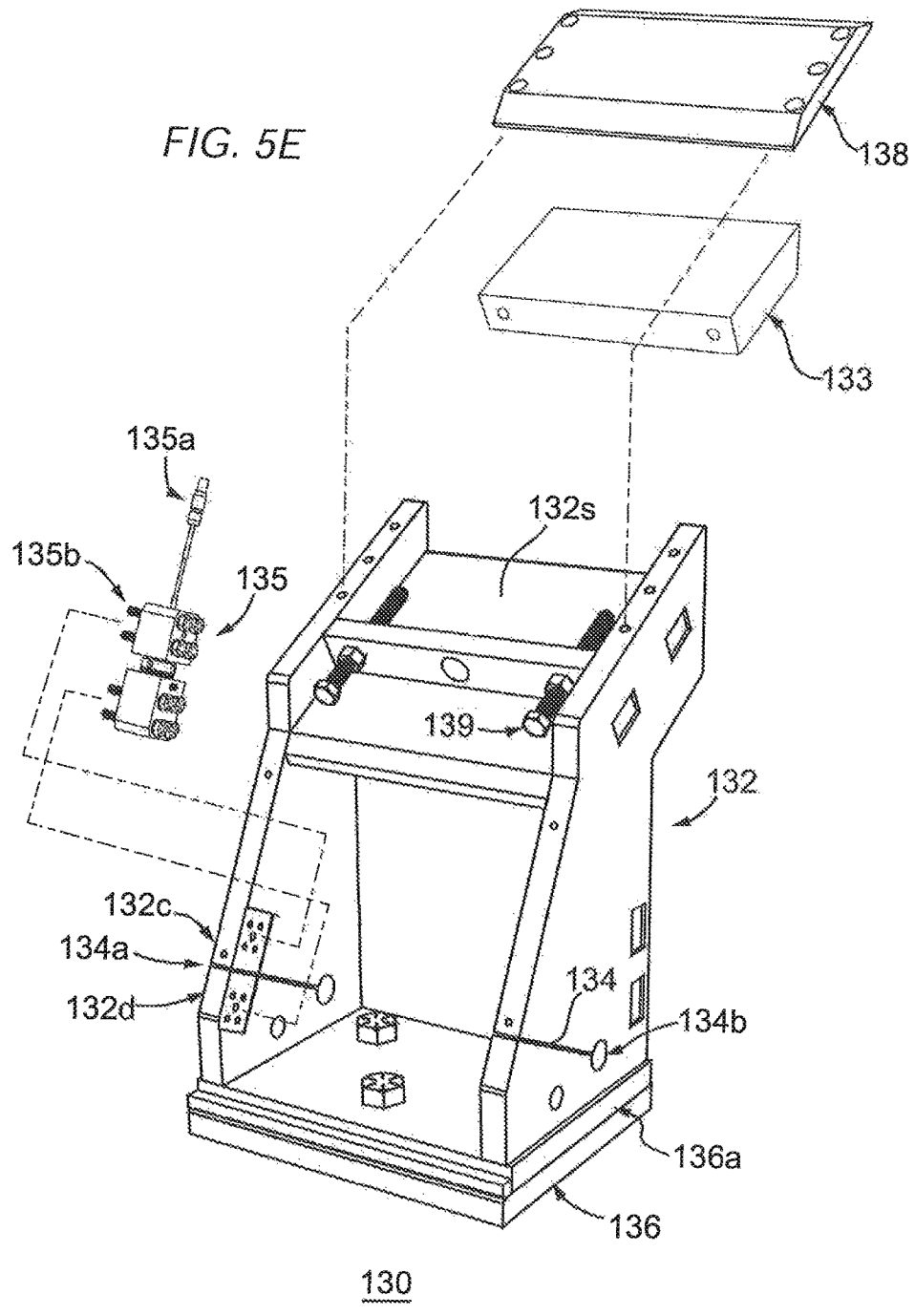

NON-CONTACTING ANTI-DEVIATION CONTROL
FOR TWIN BANDSAW

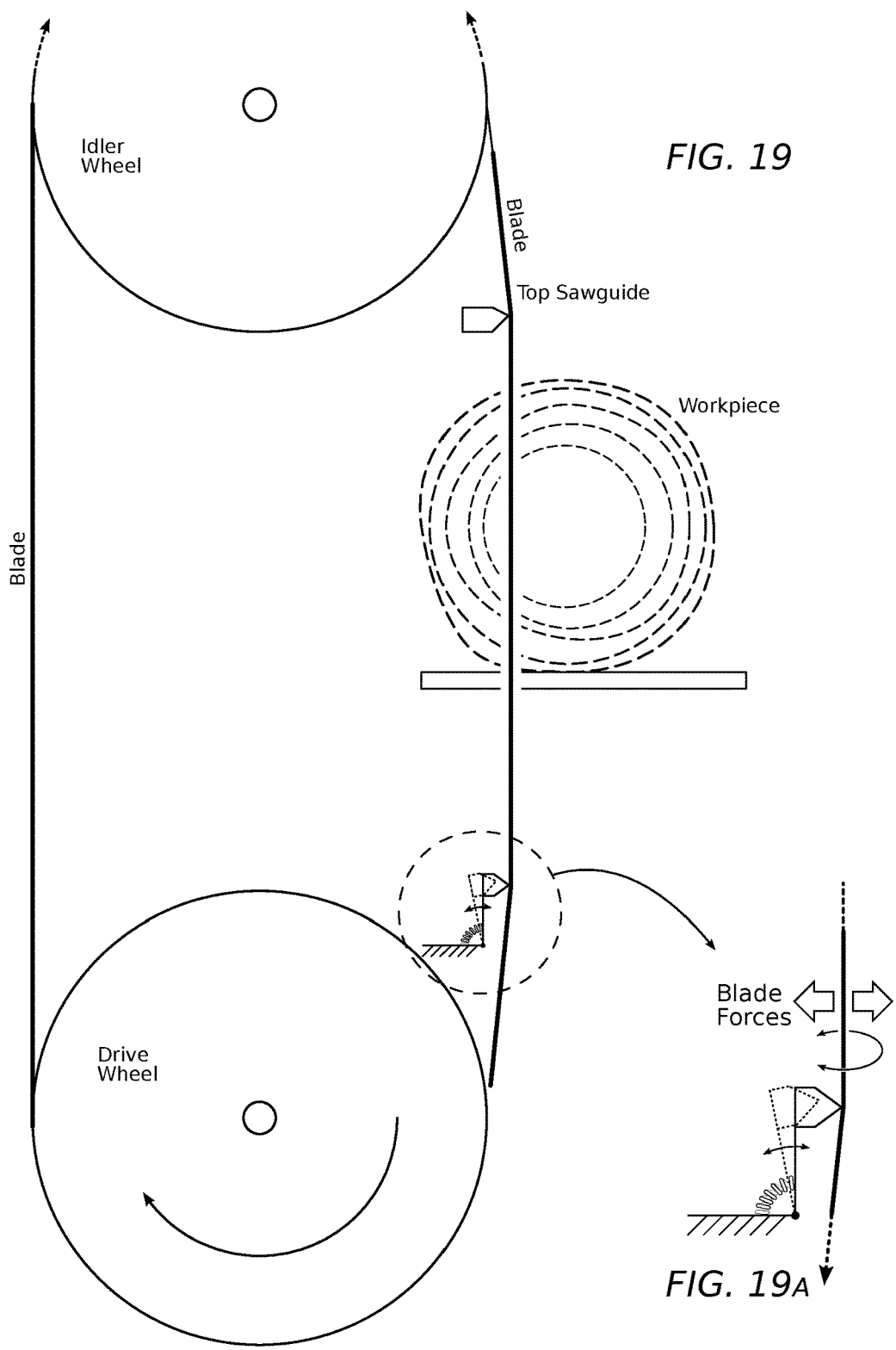

PROCESS SYSTEMS AND METHODS FOR CUTTING TRUE WITH A BANDSAW

CONTINUITY AND CLAIM OF PRIORITY

This application is related to and claims the benefit of priority under 35 U.S.C. § 119(e) from U.S. Provisional Patent Appl. No. 62/172,089 filed 6 Jun. 2015, titled "SAWCUT ANTI-DEVIATION DEVICES AND METHODS," and from U.S. Provisional Patent Appl. No. 62/323,617 filed 15 Apr. 2016, titled "PROCESS SYSTEMS AND METHODS FOR CUTTING TRUE WITH A BANDSAW," which are herein incorporated in full by reference for all purposes. This application is further related to U.S. patent application Ser. No. 14/556,139, filed 29 Nov. 2014, titled "SAWGUIDE PRESSURE FEED SPEED CONTROL SYSTEMS AND METHODS," said patent documents being co-owned and incorporated herein in entirety for all purposes by reference.

FIELD

Systems and methods for driving an anti-deviation process control loop in a bandsaw, more particularly in which process control is driven by an output of a force or deformation sensor mounted on a deformable structure to measure deformation of the structure caused by a force from a saw blade.

BACKGROUND

Bandsaws are old and well-known for use in cutting materials such as metal and wood. A bandsaw comprises a few basic parts: a drive wheel, an idler wheel, and a continuous loop or belt of toothed saw blade running over the wheels. The wheels are forced apart to tension the blade, and the drive wheel (which is commonly located below the workpiece) pulls the blade down through the workpiece to make the desired cut. The other side of the blade loop passes outside the workpiece, from the lower drive wheel to the upper idler wheel, over the idler wheel, and is similarly pulled down through the workpiece to continue the cut.

In a large bandsaw operation such as a lumber mill, a bandsaw may have a 4-16-inch wide (and 0.080-inch thick) blade passing over 60-108-inch wheels, with a 20-60-inch throat (the area between the idler wheel and the drive wheel where the blade is pulled down through the workpiece). The blade's basic tension may be on the order of 10,000 pounds, but it may increase by as much as 5,000 pounds when cutting dense lumber at a high feed rate. Saw blade guides may provide further support for the blade above and below the workpiece.

Lumber size control and log feed rate are critical parameters in the economics of bandmill operation. The timber industry uses large bandsaws to reduce logs to useable lumber sizes. Operators manipulate the velocity of the logs through the blade, but frequent out-of-plane deflections in the cut (both laterally and torsionally) due to grain, knots, saw wear, dryness, and mechanical drive-related problems act to decrease both throughput and useable product.

Conventional systems rely on a highly trained operator to monitor each cut and make manual adjustments in feedspeed on the fly. But even with the best currently available equipment, an oscillation of the sawblade in the cut can develop due to excessive feed velocity ("overfeed"). "Snaking" and "washboarding" can also result in poorer tolerance control and production losses. To avoid overfeed, throughput must be conservative, but not so conservative as to reduce yield by sub-optimal throughput. This dilemma is an unsolved problem in the industry.

Size control quality is the amount of variance in size from an expected "target." In the lumber industry, this is measured generally as a "standard deviation" derived statistically from a set of measurements of deviations of lumber size from the target size. Optimal performance will require feedspeed adjustments faster than an operator can respond, and currently available automated systems do not have feedback means to make timely adjustments in feedspeed. It would seem that automation would offer a means for speeding production throughput, but difficulties have been encountered.

Of the various approaches that have been attempted, initial efforts focused on methods for controlling feedspeed by measuring bandmill power consumption. These methods have generally failed at industrial scale because the inertial resistance to any change in RPM of the bandsaw wheels, which may be 6 ft in diameter, results in lags in response time relative to deviation of the blade from a true cut. Thus power control loops have proven sluggish in response time and are unsatisfactory because of the "flywheel effect."

A number of inventions, including co-owned U.S. Pat. No. 6,681,672 to Myrfield and U.S. Pat. No. 4,926,917 to Kirbach have employed optical, video, or laser means to "map" the saw cut so as to optimize process parameters. Other art is described in which an eddy current transducer mounted on the top sawguide, or a laser beam, and is used to detect deflection during a cut. Use of power consumption measurement has also been attempted. Again, all these are lagging indicators of deviation and are ineffective in preventing wood losses due to poor target control. Transducers are mounted on the top sawguide because the bottom sawguide is continuously showered by sawdust during a cut and as boards are cut away, the transducer is frequently hit and broken or dislodged.

Similar issues are unresolved in U.S. Pat. Nos. 5,694,821 and 6,382,062 to Smith. The systems described above all teach measurement of displacement of the sawblade proximate to the point where a tooth enters the cut. But any displacement of the saw blade at the top of the cut is preceded by a change in one or more forces at the bottom of the cut. Displacement of the blade inherently cannot occur until the tooth has sawn through the cut. Therefore, displacement measurements made above the cut are "trailing" or "lagging" measurements. Lagging signals are inadequate for closed loop control of velocity, particularly at higher feedspeed where incipient deviation occurs in microseconds. Thus all these systems are ineffective in supporting a rigorous log size control quality program for optimal yields per log.

More recently, Myrfield (U.S. patent application Ser. No. 14/556,139, co-owned by Myrfield) has proposed a force sensing system operatively coupled to the bottom sawguide. Force is measured directly and instantaneously; not as blade deviation, but through a mechanical linkage whereby force is transmitted directly to a load cell. In practice this innovation has been found to be in need of improvement because load cell-type electromechanical sensors in highly cyclic use were found to fail quickly. It is believed that the short working life is due to mechanical wear on the sensor in this direct linkage. Load cells with strain gauge sensors of the foil type or the piezoelectric type may also be damaged during setup due to the fine adjustments necessary to preload a cell with a very small displacement. Thus, the limited sensor lifetime and delicacy of the sensor packages currently available has proved to be a hurdle to commercial acceptance.

Given this background, there is a need in the art for a bandsaw feed rate controller and system with force sensing devices that are both robust and provide the needed sensitivity to incipient deviation; sensitivity that is greater or equal to the load cell systems developed earlier by Myrfield (U.S. patent application Ser. No. 14/556,139).

SUMMARY

Embodiments of the invention monitor forces on the saw blade as it exits the workpiece by directing a portion of those forces into a deformable structure and measuring the structure's deformation. The measurement produces a signal that can be used (with suitable conditioning) to control manipulated variables in the sawing process, such as workpiece feed speed.

BRIEF DESCRIPTION OF DRAWINGS

The teachings of the inventive art disclosed here are more readily understood by considering the drawings in conjunction with the written description including the claims, in which:

FIG. 3 is a plot showing displacement contours of a rigid sidewall of a guide holder around a force measurement slot, the contours (dashed lines) resulting from a load applied at a sawguide block.

FIG. 5B shows the guide holder with exterior dust covers in place.

FIG. 5E is an exploded view, showing the framing members of the guide holder, the sawguide, and the top dust cover. Also shown is a bolt-on bracket for mounting a capacitive electromechanical sensor and wire harness.

FIGS. 12A and 12B show the accelerometer assembly; FIGS. 12C and 12D are views of the sensor with mounting adaptor.

FIGS. 19 and 19A-19C are representative drawings showing various arrangements by which sawblade forces can be communicated to an elastically-deformable structure, whose deformation is measured with a non-contact sensor to monitor blade forces.

Figure 1A:
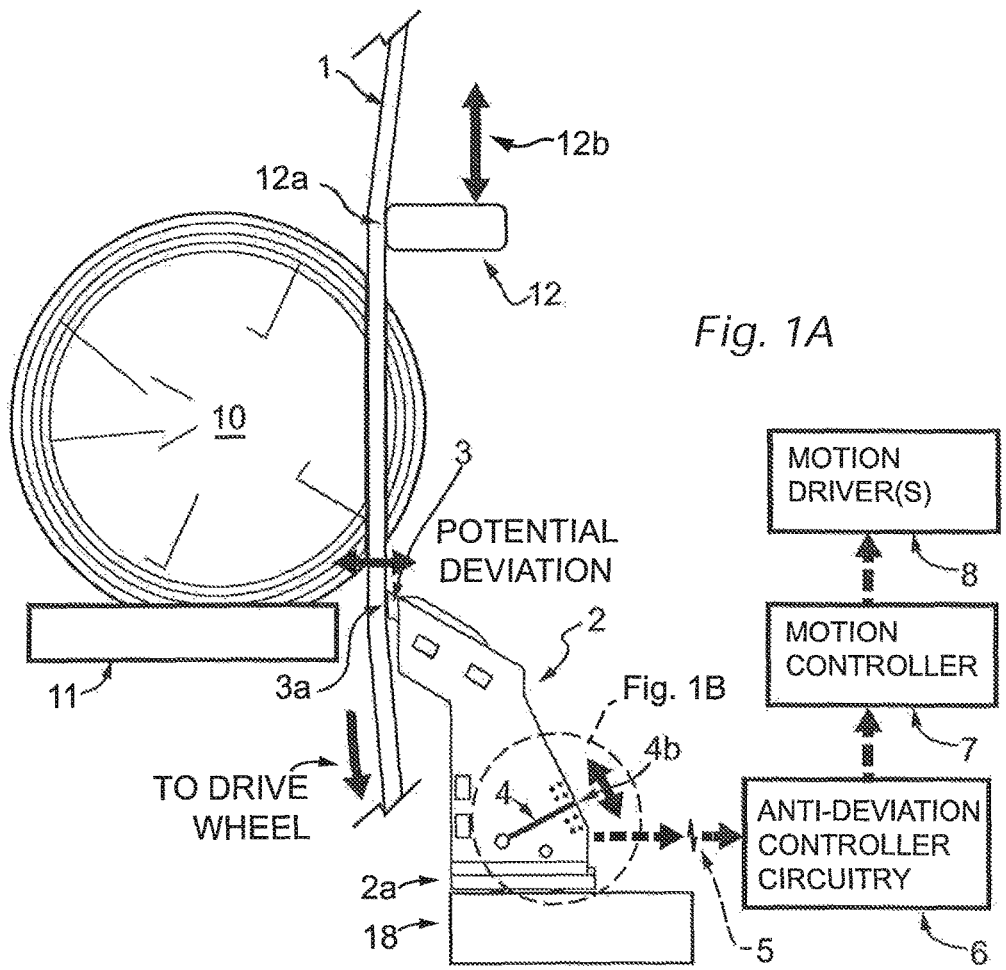
FIGS. 1A and 1B describe force transmission from a blade in a workpiece, to a sawguide, to a force measurement slot in the body of a guide holder, to an electromechanical sensor, and a closed loop in which feedback is used to implement corrective action if a force on the saw blade exceeds a limit.

The drawing figures are not necessarily to scale. Direction of motion and coupling of forces may be shown by bold arrows without further explanation where the meaning would be obvious to one skilled in the arts. Certain features or components herein may be shown in somewhat schematic form and some details of conventional elements may not be shown in the interest of clarity, explanation, or conciseness. It is to be expressly understood that the drawings are for illustration and description only and are not intended as a definition of the limits of the invention.

DETAILED DESCRIPTION

This invention relates to bandmills and more particularly to systems and methods for controlling the speed of a workpiece being fed into a cutting blade by measuring any lateral or blade deflecting forces (termed here "deflection forces") on a saw blade against or away from a sawguide (also termed a "guideblock") disposed between the cut and the drive wheel (i.e., below the workpiece, at the blade's exit from the cut).

Here we are describing an anti-deviation system and device that resists deviation by sensing any deflection force on the sawblade that would cause deviation of the cut if unchecked. These forces create deviation of the cut from the target size by deflecting the front of the sawblade and steer the cut from a true line like a rudder. As described below, in order to measure force (i.e., before deviation becomes measurable), a real time force of displacement is reported by a sensor (displacement D at sensor*spring constant K=displacement force F). The displacement detected by the sensor in order to measure force is much less than (perhaps hundreds of times less than) the displacement associated with intolerable deviation. Therefore direct measurement of "deflection force" leads and is much superior to a measurement of deviation. Lateral force is a leading indicator of impending deviation; deviation after motion occurs is a lagging indicator, and thus force is a much better input for process control.

The approach to measuring displacement forces used by an embodiment of the invention involves a carefully-engineered structure that can replace the bottom sawguide and support frame in an ordinary bandmill. (It is appreciated that the purposes of the invention can also be served by a separate structure installed near the location of an existing bottom sawguide and support.) An embodiment uses a strategically-weakened support structure to support a sawguide (or otherwise placed in contact with the saw blade so that forces in the blade are communicated to the structure.) It is important to understand that the structure is not weak in an absolute sense (i.e., it is not designed to suffer plastic deformation or to experience failure) but rather it is designed to elastically deform in a linear, repeatable and measurable way as a result of variations in the forces exerted by the saw blade.

A non-contact sensor measures the deformation of the support structure (and thus the blade force) and produces a signal that is incorporated into an automatic process control by an algorithm implemented by a process controller, such as a PID controller. For example, an increase in blade force may cause a proportional decrease in workpiece feed speed.

Figure 19B:
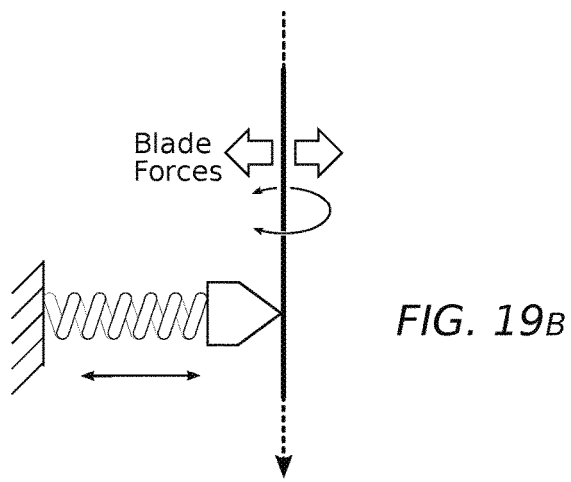
Figure 19C:
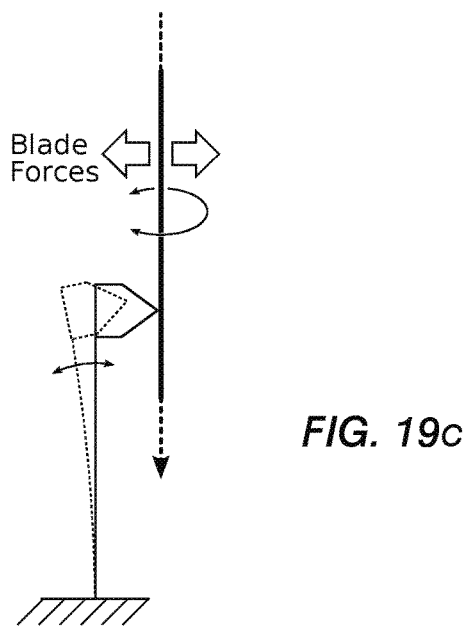

The engineered structure may be thought of as a hinge which "deforms" when the angle between the plates changes as the hinge plates rotate around the pin, supported by a spring that acts to hold the hinge plates at a fixed angle. See FIG. 19A, which is a detail of FIG. 19. The sensor in such an embodiment would measure the angle between the plates, and report changes to the process controller. Alternate embodiments include a spring that pushes a blade guide directly against the blade (FIG. 19B; sensor measures spring length), or a "leaf" spring arrangement (FIG. 19C; sensor measures flexion of the spring). These arrangements all have an effective spring constant, considering the geometry through which force is applied and the actual spring constant, such that the forces from the blade cause the structure to deform or flex through a substantial portion of the full range of the sensor. In a preferred embodiment which will be described in substantial detail below, the weakened support structure is a solid metal plate with a slot and other features. Although there is no smooth bearing pin about which the portions of the plate rotate effortlessly, the structure will be described as having a "flexural hinge"—that is, for purposes of the present invention, it behaves like the sprung hinge described above, with a spring constant determined by the geometry of the plate, the location of the slot and the properties of the metal. An embodiment measures the deformation of the plate due to force from the saw blade to produce the desired process control signal.

To measure displacement force, one may mechanically couple the bottom sawguide to a force measurement slot in the guide holder. The force measurement slot has two opposing planar surfaces joined at a hinge. Deformation of the guide holder results in displacement of the force measurement slot. The sawguide, guide holder, and force measurement slot are mechanically coupled and have a mechanical advantage. Deflection forces and out-of-plane forces on the sawblade are transferred as forces on the sawguide that in turn result in transitory forces that narrow or widen the force measurement slot. Without being bound by theory, the length of the force measurement slot serves as an amplifier for measuring very small displacement motions. The force measurement slot is configured to define a "hinge region" having a spring constant in the guide holder and, although very stiff, operates to mechanically transfer or couple changes in blade force F on the sawguide to an electromechanical sensor that senses displacement motion or acceleration at the force measurement slot. As used here, a guide holder (see FIG. 1) having a force measurement slot and an electromechanical sensor in combination is termed a "force sensing device." The sensor output is transmitted to an anti-deviation controller for processing and signals are input to motion controllers as needed to close a process control loop. Changes in workpiece feedspeed are implemented by the motion controller, allowing the sawblade to return to a true cut line. Sawguides are removable from the guide holder for periodic resurfacing.

Any conventional motion controller configured to drive workpiece feed through a bandmill may be used with the anti-deviation control systems of the invention. Feedspeed is slowed when incipient deviation is detected so that any deflection forces can be resolved; feedspeed is increased to an optimal level when lateral or out-of-plane forces are within control limits. Preferred force sensing devices include non-contact electromechanical sensors selected from capacitive sensors, a new generation of eddy current sensors operating at very high frequency, laser deflection sensors, laser interferometers, and accelerometers, without limitation thereto. The sensors of the inventive force sensing devices described here operate on non-contact principles of operation and have the required sensitivity. Advantageously, survivability of these sensor packages is found to be highly improved over sensors having a contacting surface and direct mechanical linkage to the sawguide.

The bottom or exit end of a bandsaw cut is a violent and dirty environment. Bandsaw blades measuring 8 to 11 inches in width and 30 to 50 ft in length are used to reduce full-sized logs (having generally from 4 to 30 inch depth of cut) to saleable lumber sizes. Ideally the cuts require no secondary processing on bandsawn surfaces and minimal planing to achieve required tolerances. The teeth of these blades may be two inches or more in spacing with an inch or deeper gullet. The linear velocity of the blade is on the order of 9,000 to 11,000 ft/min or more, causing a shower of sawdust at the cut exit. As lumber is sawed off, boards weighing up to hundreds of pounds fall from the carriage. Any log motion results in huge stresses on the blades, which are pre-strained to 20,000 lbs between the wheels, putting 10,000 lbs on both the sawing and return side. The blades are held plumb by a pair of sawguides or "guideblocks" mounted in guide holders positioned above and below the cut. The bottom sawguide rests in a bottom sawguide holder.

Thus the bottom guide holder is a heavy duty stationary steel frame fitted with a heat resistant, low friction sawguide in minimal clearance from the cut exit end. These features are turned to advantage in the inventive systems disclosed here. The closeness of the blade to the sawguide results in a more sensitive measurement, the high stiffness of the guide holder enables the sensor to be positioned away from the sawguide—but to respond to forces on the sawguide transmitted through the mechanical stack. The guide holder stores restoring force F'. A dust-sealed housing encloses the sensor (s), and force measurement slot(s), so that the device can withstand the particulates generated at the cut exit.

In use, the bottom sawguide is contacted on a first face of the moving blade near its exit from the cut and any change in sawguide "pressure" is instantaneously detected by an electromechanical sensor in proximity to, seating on, or straddling the force measurement slot of the guide holder. Because the blade is pre-strained on the sawguide, the sensor will reliably detect both positive and negative deflection forces on the blade, essentially in real time, and will output a signal. (Often, this is a "raw" signal of low voltage and high impedance. Most systems will "condition" the signal by amplifying it and adjusting it to an analog input range of a Proportional-Integral-Derivative ["PID"] controller.) Then, using a process controller and algorithms for motion control, a feedspeed "adjustment" or "correction" is implemented that avoids blade deviation and allows the blade to relax or recover, restoring the cut to a straight line. As soon as the incipient deviation is corrected, the forward motion of the log may be increased to resume optimal speed. Advantageously, by positioning the force sensing device between the cut exit and the drive wheel, any change detected in pressure or force precedes an actual blade deviation event, resulting in a faster and more precise correction with minimal overcompensation. This translates into a direct economic value in quantity and quality of the resultant lumber.

The force sensing device is engineered to contain one of a family of non-contact sensors operatively coupled to a force measurement slot of the guide holder. The sensors are mechanically coupled to sense the change in displacement (i.e., motion) across the force measurement slot but operate using a non-contacting probe, such as a capacitive sensor, an eddy current sensor, or an accelerometer. In other words, these non-contact sensors measure (change in) distance between two measurement points without a mechanical connection between the points—they measure the strength of an electric or magnetic field, or interaction of a laser beam, rather than a physical substance or structure connecting the measurement points. In contrast, load cells that straddle the force measurement slot are subject to an intense cyclical loading that mechanically degrades the load cell or its contacting surface.

In a first embodiment, by using a focused non-contact capacitive sensor, a standoff of several mils is readily achieved. The dynamic range, when coupled to a hinge region with 300,000 lb/inch spring constant, is sufficient to accurately measure from zero to about one mil of displacement motion. As before, incipient deviation begins with a change in lateral force on the sawguide, resulting in a displacement across a force measurement slot in the guide holder. The sensitivity of the sensor is such that any small change in force results in a signal to an anti-deviation controller as described here. This force travels through the bottom sawguide, and to a non-contacting electromechanical sensor in the guide holder. The electromechanical sensor output becomes a leading process signal, such that corrective action (for instance, slowing of the feedspeed) may be implemented before a measurable deterioration (either an "overthickness" or an "underthickness") of the lumber target size is observed.

The force is seen on the bottom guide first as the blade leaves the cut. A change in tension between the cut and the driving wheel can be felt by the bottom guide first because the driving wheel is pulling tension over the bottom guide.

As a general rule, the lower the standard deviation of a bandsaw (in mils), the higher the yield of lumber. The sawing accuracy is increased by the degree of accuracy of anti-deviation control obtained with the force sensing devices and feedback control systems of the invention, a technical advance in the art.

In addition to capacitive sensors, other kinds of non-contacting sensors having the required properties are contemplated. These include solid state or MEMS-based accelerometers and gyroscopes, and also advanced eddy current devices. Acceleration is directly proportional to force, which is the measurement of interest, and leads the motion required to cause the displacement needed to measure force with a spring and a displacement sensor. This force measurement will provide an even further "leading" process variable. The measurement is converted to a control voltage signal that can be integrated over time if needed. These feedback signals are generally implemented with solid state circuits that are part of the sensor package. High frequency eddy current devices are useful, but are somewhat more complex to implement.

In operation of a bandmill according to the principles of the invention, the cutting step is generally controlled automatically by a computing machine having a processor and programmable instructions in memory, including algorithms to convert the force sensing output signal and at least one feed position coordinate into changes in feedspeed, and for outputting any feedspeed adjustments to a motion controller.

In more specificity, the invention is a system for detecting an incipient deviation of a cut from a true cut line or excess sawing resistance by sensing a force on a sawblade as it exits a cut in a workpiece. A bandmill incorporating the principles of the invention includes a force sensing device, the force sensing device combining a) a bottom sawguide and guide holder, the bottom sawguide having a front face for contacting and pre-straining the sawblade; b) a force measurement slot defining a hinge region in the guide holder, the hinge region having a spring constant; c) an electromechanical sensor non-contactingly coupled (directly or indirectly) to the force measurement slot; such that the force sensing device is enabled to sense a force associated with an incipient lateral or out-of-plane deviation or excess sawing resistance of the sawblade as coupled to the bottom sawguide and to output an electrical signal indicative of a magnitude and a direction of the force. The system includes an anti-deviation control system with circuitry and logic configured to i) receive the electrical signal output from the force sensing device, ii) calculate a magnitude and a direction of the force, and iii) output a feedspeed adjustment to prevent or correct any deviation. The feedspeed adjustment is fed to a motion controller system configured to operate a motion drive or drives that engage and direct motion of the workpiece relative to the sawblade. The motion drives may include conventional workpiece drives such as for moving a log through a bandmill, for example.

In a preferred system, the force transducer is indirectly coupled to the sawguide block. The guide holder walls carry the force of interest to a "force measurement slot" where a direct measurement of the force can be made with a non-contacting gap distance sensor.

These and other elements, features, steps, and advantages of the invention will be more readily understood upon consideration of the following detailed description of the invention, taken in conjunction with the accompanying drawings, in which presently preferred embodiments of the invention are illustrated by way of example, and in the claims.

The various elements, features, steps, and combinations thereof that characterize aspects of the invention are pointed out with particularity in the claims annexed to and forming part of this disclosure. The invention does not necessarily reside in any one of these aspects taken alone, but rather in the invention taken as a whole.

Although the following detailed description contains specific details for the purposes of illustration, one of skill in the art will appreciate that many variations and alterations to the following details are within the scope of the claimed invention. The following glossary is set forth as an aid in explaining the invention as claimed.

Glossary and Notation

Certain terms are used throughout the following description to refer to particular features, steps or components, and are used as terms of disclosure and not of limitation. As one skilled in the art will appreciate, different persons may refer to the same feature, step or component by different names. Components, steps or features that differ in name but not in structure, function or action are considered equivalent and not distinguishable, and may be substituted herein without departure from the invention. Certain meanings are defined here as intended by the inventors, i.e., they are intrinsic meanings. Other words and phrases used herein take their meaning as consistent with usage as would be apparent to one skilled in the relevant arts. The following definitions supplement those set forth elsewhere in this specification.

"Deflection forces" generally relate to a force exerted on a sawguide by a bandsaw blade as shown in FIG. 3. Because the blade is pre-stressed against the sawguide, both deflection forces against and away from the sawguide have a net change in the force on the sawguide.

"Deformation" relates particularly, as used here, to lateral forces on a guide housing as shown in FIG. 3. "Deformation" is the result of a force applied to a sawguide and guide holder, the guide holder has a stiffness and a spring constant, and a flexion or bending moment when subjected to a deforming force. Such forces result in reversible deformations of a very stiff but elastic body with a significant FOS (factor of safety) before yielding.

"Deviation" refers to a change in the cut line from a true cut in the workpiece, and may be an X-Y deviation—where the blade turns from a true cut line on the X-Y plane (typically a ground plane), or may be an angular deviation on the Y-Z plane—where the saw cut becomes out of plumb, tilting in a Z-dimension relative to the X-Y plane. Both deviations result from elastic deformations of the bandsaw blade that are out-of-plane relative to the normal plane of the bandsaw blade in a true cut.

"Incipient deviation" is a deviation for which a deflection force vector is detectable but no obvious deviation of the blade is evident at the moment in time.

"Displacement" relates to a measured motion against a spring at a force measurement slot in the guide holder frame as shown in FIG. 3. Displacement is used here to indicate a motion to an electromechanical sensor through a force measurement slot of a guide holder and will vary with the deformation through the sawguide.

"Flexure member", refers to a structure within a bottom guide housing having a flexural mode, i.e., a feature mechanically linked to the sawguide with a mechanical advantage and having a capacity to flex according to one or more forces applied to the sawguide. Generally the degree of flexation is insubstantial or essentially undetectable, as is achieved by engineering the structural stiffness and elastic modulus of the flexure member and surrounding support frame of the guide housing. The degree of flexation is further engineered so as to not exceed a factor of safety (FOS).

"Force measurement slot", as used here, refers to a full-thickness slot or channel partially cutting a framing member or sidewall of a guide holder. The slot or "cut" is configured to separate an upper part and a bottom part of the guide holder frame and extends part way (i.e., is a full thickness slot) forward from a "mouth" opening on a lateral aspect of the framing member in a generally forward direction almost to the front of the frame, thereby weakening the frame. The slot terminates before completely bisecting the frame from front to back, but may extend from side to side through the entire width or thickness of the guide holder frame (including any reinforcing members or sidewalls) so as to respond to lateral and out-of-plane forces on the sawguide. In instances where two sidewalls frame a guideholder, the slot will generally cut both. The slot pre-disposes the framing member to "flex" at the laterally placed mouth of the slot, the slot having a geometry, a "height" dimension across the slot, a length, and an aspect ratio configured such that a deformation force on the sawguide is propagated to the mouth of the slot; i.e., a flexural motion/deformation in the framing member is manifested as a motion at the mouth of the slot by a change in slot height $\Delta z$ between two apposing planar surfaces bounding the slot, and may be an increase or a decrease in slot height depending on the applied force. Recall that the saw blade is pre-stressed against the sawguide. The slot defines a residual bottom member that is not bisected, and that residual member is analyzed as a stiff and elastic "flexure hinge" or "beam" for measuring force-related displacement at the mouth of the slot, and a dynamic top member that bends in response to sawguide forces. The hinge region (also termed here a "flexural member") so defined has a spring coefficient and can be engineered for stiffness and elastic modulus so that the dynamic range of displacement motion at the mouth of the slot is proportionate to a force applied to the sawguide (while being essentially rigid). Any dimensional change in the separation of the top of the slot relative to the bottom at the mouth is a determinate response to a force on the bandsaw blade against the sawguide.

"Force transducer assembly" refers here to a transducer package including an electromechanical sensor that converts an input mechanical force into an electrical signal output such that the strength and polarity of the raw electrical signal is determinative of the strength and polarity of the input mechanical force. Examples of electromechanical sensors include capacitive sensors configured in a non-contacting package, eddy current sensors configured in a non-contacting package (particularly high-performance eddy current sensors having an excitation frequency greater or equal to 1 MHz), accelerometer packages that are non-contacting, and load cells in a contacting package. Thus families force transducer packages with non-contacting or contacting electromechanical sensors may be used in invention without limitation.

"Workpiece" is a piece of material or an object to be worked on or operated on by a process, apparatus, machine or device. A workpiece is not claimed as a part of the invention and may include without limitation, a log with or without bark, any piece of roundwood, a piece of wood (including lumber) without reference to shape, or other material including ceramic and metal as may be sawn with a bandsaw or circular blade so as to "cut" the material, the sawblade generally having teeth along at least one edge such that, when "cutting", the blade is enabled to make an entry into the workpiece and an exit from the workpiece along a cut line defined by an operator or an optimizing and positioning system.

"Feedspeed" generally refers to the linear velocity of the workpiece relative to the fixed position of the sawblade or blades. Various motion drives are known in the art. Devices for feeding a workpiece through a bandmill may include an X-Y-Z controller and may involve multiple arms, rollers, a sharp chain, a reciprocating carriage, and the like as known in the art. Equivalently, feedspeed may also refer to the velocity of a sawblade moving through a fixed workpiece.

"Underfeed" is defined by a condition in which the cut speed is sub-optimal and throughput is slower than possible, either due to an excess of caution (e.g., with conservative "speed to depth-of-cut" velocity control) or to operator over-correction in manually controlled systems.

"Overfeed" is a condition in which the log is moving relative to the bandsaw at a velocity that causes the cut to deviate or deflect from a straight path, or for the bandmill power consumption to exceed the limit of its drive motor, or both. In this condition, the gullet fill limit is exceeded and saw power consumption may exceed drive motor limits. In extreme overfeeding the bandsaw can be pushed off the wheel or deviate far enough to contact the drive mechanism and break—a very unsafe condition. According to the invention, for optimal operation, feedspeed may be increased until a limit is reached when a deviation becomes "incipient" and the speed is thus bordering on an overfeed condition.

The "gullet fill", relates to the packing of wood chips and sawdust into the gullet between each tooth of the sawblade during a cut. Gullet overfill may lead to saw deviation or deflection. With a constant sawblade speed, the gullet fill is proportional to the depth-of-cut multiplied by the feedspeed. An optimal gullet fill will change with wood species, dryness, saw shape and saw condition, all of which affect the way the wood chips pack into the gullet. This information is used in automated control programs to adjust feedspeed and sawblade preventative maintenance.

"Target size" is a term of art used here to describe process control tolerances for lumber size as achieved by a bandsaw operation on green wood, generally as part of a sawmilling operation. Target size includes variability associated with deviation and roughness per saw line. Snaking, washboarding, roughness and deviations from the saw line result in tangible losses of product, measured as saleable board feet per log. Poor target size control requires greater planning allowances that reduce yield. Factors brought into target size are described in more detail in BROWN TD, 2000, "Lumber size control", OSU Extension Publication 8731, 28 pp, incorporated here by reference.

General connection terms including, but not limited to "connected," "attached," "linked," "coupled," "conjoined," "secured," "mounted", and "affixed" are not meant to be limiting, such that structures so "associated" may have more than one way of being associated. "Digitally connected" indicates a connection for conveying a digital signal therethrough; "electrically connected" indicates a connection for conveying or sensing a current or a voltage therethrough; "electromagnetically connected" indicates a connection or linkage for conveying or sensing a Coulombic or Lorentz force therethrough; "mechanically connected" indicates a connection, mechanical stack, or linkage for conveying or sensing a force therethrough, and so forth.

Relative terms should be construed as such. For example, the term "front" is meant to be relative to the term "back," the term "upper" is meant to be relative to the term "lower," the term "anterior" is meant to be relative to the term "posterior," the term "vertical" is meant to be relative to the term "horizontal," the term "top" is meant to be relative to the term "bottom," and the term "inside" is meant to be relative to the term "outside," and so forth. Unless specifically stated otherwise, the terms "first," "second," "third," and "fourth" are meant solely for purposes of designation and not for order or for limitation. Because bandsaws may be configured to be vertical, horizontal, or even operated upside down, the descriptors "top" and "bottom" are used relative to the position of idler wheel and drive wheel as shown in FIG. 1, where the drive wheel is generally on the "bottom."

"Processor" refers to a digital device as part of a "computing machine" that accepts information in digital form and manipulates it for a specific result based on a sequence of programmed instructions. Processors are generally supported by non-volatile memory (for storage of programmable instructions, e.g., ROM) and dynamic memory (e.g., RAM), a timing clock or clocks, and digital input and outputs as well as one or more communications protocols. One or more processors may be integrated into the display, calculation, sensor and communications modules of an apparatus of the invention, and may communicate with other microprocessors or with a network via wireless or wired connections known to those skilled in the art. The comprehensive term "computing machine" includes individual computers, software engines, or servers operating independently and/or formed into networks, the network constituting a machine.

"Adapted to" includes and encompasses the meanings of "capable of" and additionally, "designed to", as applies to those uses intended by the patent. In contrast, a claim drafted with the limitation "capable of" also encompasses unintended uses and misuses of a functional element beyond those uses indicated in the disclosure. *Aspex Eyewear* v *Marchon Eyewear* 672 F.3d 1335, 1349 (Fed Cir 2012). "Configured to", as used here, is taken to indicate is able to, is designed to, and is intended to function in support of the inventive structures, and is thus more stringent than "enabled to".

It should be noted that the terms "may," "can," and "might" are used to indicate alternatives and optional features and only should be construed as a limitation if specifically included in the claims. The various components, features, steps, or embodiments thereof are all "preferred" whether or not specifically so indicated. Claims not including a specific limitation should not be construed to include that limitation. For example, the term "a" or "an" as used in the claims does not exclude a plurality.

"Conventional" refers to a term or method designating that which is known and commonly understood in the technology to which this invention relates.

When describing the claimed inventions, unless the context requires otherwise, throughout the specification and claims that follow, the term "comprise" and variations thereof, such as, "comprises" and "comprising" are to be construed in an open, inclusive sense—as in "including, but not limited to." Further, the appended claims are not to be interpreted as including means-plus-function limitations, unless a given claim explicitly evokes the means-plus-function clause of 35 USC § 112 para (f) by using the phrase "means for" followed by a verb in gerund form.

Taken together, FIGS. 1A, 1B, 2A, 2B and 2C describe a device and process control system for transfer of a "potential deviation or deflection force" F from blade 1 and workpiece 10, to bottom sawguide 3, through the body of bottom guide holder 2 as a "deformation", to force measurement slot 4, where the deformation is manifested in the slot as a $\Delta z$ (proportionate to "force on sawguide" or "slot displacement motion") such that any blade deflection or incipient deviation can be sensed, measured, and reported by a non-contacting electromechanical sensor positioned at 30. Using systems of the invention with non-contacting motion sensors, blade deviation can be controlled with feedback loop process control circuitry (6, 7, 8).

In the exemplary embodiment of FIG. 1A, the bandsaw blade is pre-strained. Generally the blade is stretched under a tension of 10,000 pounds or so. In addition, the bandsaw is displaced laterally by a pair of sawguides (3, 12) so that a part of the tensile force is directed sideways at the sawguide faces (3a, 12a). By pre-straining the blade, lateral, contralateral, any out-of-plane forces on the sawguide may be detected. Referring again to the figures (including FIG. 3), the bottom sawguide 3 contacts the blade at 3a. The top sawguide 12 is mounted above the workpiece 10, contacts the blade at 12a, and can be adjusted vertically (arrow at 12b) and may be raised or lowered according to the size of the workpiece in order to maximize support for the sawblade during the sawing step. The blade is generally plumb between the two front faces (3a, 12a) of the sawguides. The bandsaw is provided with adjustment bolts by which the sawguides (3, 12) are biased so as to align the sawblade with the direction of travel of the workpiece.

During cutting, the drive wheel pulls down on the sawblade (FIG. 2A) so that the cutting force of the saw teeth increases the tension along the sawblade between the workpiece and the drive wheel. Blade cutting action is downward and vertical in these views, toward a drive wheel (not shown, blade tooth 1a orientation toward cut). The lower section of sawblade at the exit from the cut is stretched over the bottom sawguide at 3a. The lateral force pre-straining the bottom sawguide can be about 100 pounds, for example. A change in bandsaw force on the bottom sawguide may reflect an incipient deviation from a true cut, overfeeding, and/or an increase in wood resistance in the cut. These can be related to the density and dryness of the wood, or the grain structure, for example. Deviation and deflection forces can be lateral in-plane, out-of-plane vertical twists, or out-of-plane horizontal twists and can be associated with snaking. In a first embodiment of the invention, changes in the forces on the bottom sawguide are found to be useful in predicting deviations from a true cut line, and may be used in controlling feedspeed of the workpiece by a feedback loop to minimize prevent or minimize these deviations. When feedspeed is reduced, restorative forces on the blade tend to return the blade to a true cut.

Workpiece 10 is mounted on a reciprocating carriage 11, or other prime mover, and is driven at a perpendicular to the plane of the drawing of FIG. 1A. Descriptions of principles and mechanisms for moving logs through a cutting operation are found in U.S. Pat. Nos. 4,926,917, 5,694,821, 6,382,062, and 6,681,672, all of which are incorporated herein by reference as background on log motion control. Common "motion control mechanisms" include a reciprocating carriage, sled, an end-dogging carriage, a sharp chain and a press roll assembly, while not limited thereto. These motion control mechanisms may include accessory apparatus for skewing or slewing the log according to its geometry as well as for driving the log through the blade (or vice versa, driving the blade through the log).

Log position may be assessed at any time using a variety of instrumentation known in the art. The first derivative (l/dt) is the "feedspeed" velocity of the workpiece 10 at any time during the cut relative to a linear position x. But what has been lacking has been a sensor having a realtime output that is predictive of sawcut deviation. An electromechanical sensor operatively coupled to the bottom sawguide enables a practical and sensitive apparatus and method for minimizing deviation and snaking, surprisingly and advantageously while synergically optimizing throughput.

The electronics are described here schematically in FIG. 1A, and include an anti-deviation controller circuit 6 with processor and programmable logic, having an input 5 from the electromechanical sensor and an output to a motion controller system 7, which in turn controls a carriage drive and motor(s), or other log handling system. Dashed lines indicate wire harnesses. Generally the circuit operates as a digital circuit, and includes an A/D converter for digitizing the electromechanical sensor signal. Advantageously, between each cut, the baseline input from the electromechanical sensor may be saved as a digital zero. Calibration of response slope may also be performed periodically. Safety features, overrides, and quality control monitoring and reporting are typically engineered into the electronics or the associated programming.

Reducing speed to keep the sawguide "pressure" within plus and minus limits (with the baseline pressure between cuts as the "zero") reduces the amount of deviation or "snaking" and, because the action of the anti-deviation controller is so fast in real time, achieves higher feed throughput and better quality lumber in sawmill use. When change in sawguide force is reduced, feedspeed can be increased, so that the feedback loop functions for both negative and positive feedback on feedspeed. Closed loop motion control is readily achieved with minimal overcorrection or hysteresis.

For reference, the footprint of a representative force transducer assembly 30 with non-contacting electromechanical sensor is shown as a dashed rectangle spanning the force measurement slot 4 near the mouth 4a. A stress relief hole 4b is drilled out at the closed hinge end 4b of the slot to eliminate fatigue failure. The closed end of the slot acts as a hinge region or beam having a spring constant K for flexure as described below. The electromechanical sensors and force transducer assemblies for using non-contacting sensors will be described in more detail further below.

Figure 1B:
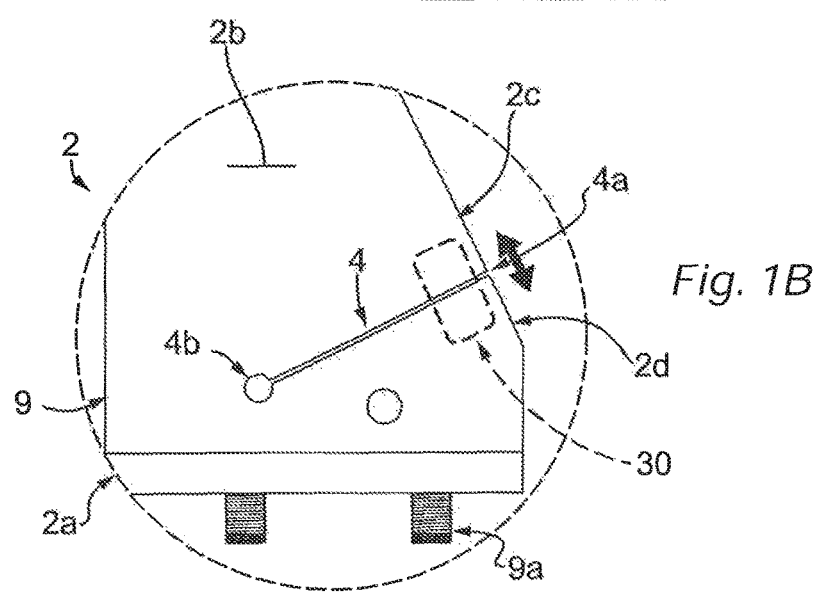
Figure 18A:
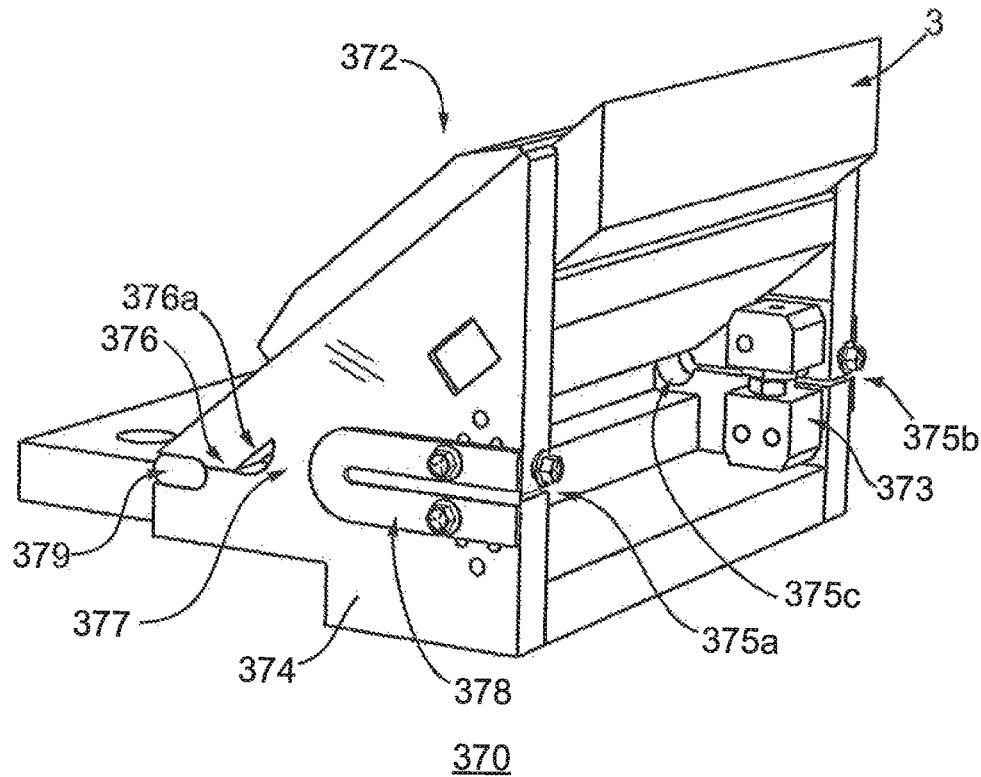
FIG. 18A is a perspective view of a low profile anti-deviation device having anterior and posterior slots defining a flexural member or flexure hinge between the strain relief cutouts of the two opposing slots.

Advantageously, as shown in FIGS. 1A and 1B taken together, any lateral forces transferred from the blade 1 to the wall 2b of the guide holder are focused on the electromechanical sensor in force transducer assembly 30. The guide holder wall, sidewall or frame (termed here in composite a "framing member" 2b) is engineered so that the spring constant K of the material is very stiff. Shown are guide holder 2, sidewall 2b with forward frame edge 9, base 2a, and base anchor bolts 9a. The force measurement slot 4 is disposed between superior aspect 2c and the inferior aspect 2d of the guide holder support frame and extends part way (i.e., extending a part of the way) from the "slot mouth" 4a (defined posteriolaterally on the holder, framing member, or a sidewall thereof) in a generally forward direction through the housing, framing member or sidewall. The slot terminates at a stress relief hole and "hinge region" 4b. The slot depth is a full thickness cut in the framing members, thus pre-disposing the framing member to springedly "flex" at the mouth of the slot, the slot having a geometry and an aspect ratio configured such that a force on the sawguide block 3 is manifested as a displacement at the mouth of the slot 4*a*. The angulation and dimensions of the slot relative to the guide holder and sawguide are engineered as needed, may be varied for example according to the guide holder requirements as shown in FIG. 10B or FIG. 18A, but are not limited in dimension or angle to any of the exemplary configurations described here.

Essentially the slot 4 creates a weakness in the framing member of the guide holder so that any flexion directed at the mouth of the slot. The slot includes upper and lower apposing surfaces or edges joined at one end by a hinge region 4*b*. This may be termed here a "flexure hinge" but is characterized by a stiffness and a spring constant such that very limited flexion is permitted. Also the hinge is fully elastic and provides a restoring spring force on the guide holder such that any deformation is fully reversible.

Generally the saws are pre-strained (also termed "biased") and the sensor output recorded as zero (between each cut for example) such that a displacement motion in either direction results in a change in the electrical signal output. As shown schematically in FIG. 2A, the sensor generates electrical signal 5 and transmits the signal in real time to anti-deviation controller circuitry 6. Processing of the signal according to algorithms of the invention results in a near instantaneous command or commands issued to the motion drive(s) 8, including for example carriage feedspeed. If a motion associated with a displacement force at the force measurement slot (associated with incipient blade deviation) is detected, the carriage feedspeed is automatically slowed so that the force can be resolved, and conversely, if no force is detected, the feedspeed is allowed to resume at the carriage feedspeed for the current depth of cut until another potential deviation event is detected. Generally a motion controller system 7 is used for workpiece motion control. Thus in a first aspect, the invention relates to an apparatus for sensing blade potential deviation (and cut resistance) by monitoring one or more transducer assemblies with electromechanical sensors incorporated into a framing member supporting the bottom sawguide, such that the electromechanical sensor is coupled (indirectly) to the sawguide front face, i.e., the face that directly contacts the blade between the cut and the drive wheel. In a typical application, a bottom guide holder 2 couples the blade face of the sawguide 3 and the transducer sensor package 30. The force transducer assembly 30 (and electromechanical sensor) is mechanically linked to the guide holder so as to contactingly sense a force, or also according to the present invention, may preferably be linked so as to non-contactingly sense a force. Experience has suggested that non-contacting sensors are more commercially attractive and represent an improvement over mechanical sensors such as strain gauges. The non-contacting sensors have similar sensitivities, but require less frequent change-out for damage caused by the highly cyclic and overstressed environment experienced by the guide holder. In short, they don't break as readily as strain gauges and related load cells. The capacity to non-contactingly sense a force on the blade through an electromechanical sensor operatively disposed at a "flexural member" (i.e., having a flexural mode such as a flexure hinge) in the framing, wall or sidewall of the bottom guide holder and to use the output signal from the electromechanical sensor in a feedback loop for controlling workpiece feedspeed is an advance in the art.

Surprisingly, sawguide force is a good measurement of potential deviation even before displacement motion is readily apparent. Incipient deviation is transferred through the guide holder frame instantly and appears as displacement across the force measurement slot or other flexural member in the guide holder. The sensitivity of the sensor is such that any small displacement D results in a signal to an anti-deviation controller as described here. While not bound by theory, what is being measured is not merely a mechanical displacement D, but rather a force associated with saw blade deflection. The displacement force F is written as:

$$F = K \cdot D$$

where K is the spring constant of the material and D is the displacement. The displacement force is determinate according to the blade deflection force and the sawguide deformation, and the force measurement slot is engineered to maximize detection sensitivity so as to approach a zero limit. Importantly, the guide holder is a spring, having a restoration force when displaced, and is not merely a device for measuring a fixed displacement. The displacement may be viewed in terms of the Calculus, where the derivative of displacement $dD/dt/dt$ is acceleration and is directly proportionate to force represented in F=ma. This can be distinguished from the absolute displacement $(D_0-D_i)$ at any time t because the first derivative of the rate of change of displacement is a velocity, the second derivative is an acceleration, and the third derivative is a jerk (or "jolt"). These three derivatives are highly relevant to motion control in real time, whereas the absolute displacement at any instant is not particularly helpful.

Advantageously, any potential deviation vector on the sawguide blocks is seen immediately as a displacement vector at the force measurement slot. This allows the measurement system to be kept clear of proximity to the dirty, particulate environment under the blade and allows it to be protected inside the guide holder from sawdust and grit while preserving the maximal sensitivity to forces found only at the blade exit from the cut. It also re-orients the direction of any force vector from normal to the sawblade to essentially perpendicular to the slot boundary so that a measurement system can be reliably and reproducibly placed inside the housing. And there is an inherent spring tension that opposes the displacement, elastically returning the measurement system to its zero as the blade returns to a neutral position (as on a true cut line). The sensor output is centered in the sensor's dynamic range.

In another embodiment, but analogously, the deflection force instead can be treated as an acceleration so that the acceleration (as deflection force) of the sawguide blocks is seen by an accelerometer at the force measurement slot. The acceleration can be integrated to find positional displacement.

For the engineering of the guide holder and force measurement slot, it is helpful to consider the sidewall of the guide holder as a beam having a length equal to the residual plate material between the bottom of the slot and the front wall of the guide holder, and to engineer the material so that the spring force for a beam bending motion is sufficiently stiff. For example, a beam and slot configuration may be engineered such that the stiffness or spring constant K of the wall plate is 300,000 pounds per inch. Surprisingly, with a sensor mounted at the mouth of the slot, a displacement resulting from a hand placed on the sawguide block results in a measurable output, demonstrating that the stiffness is not a limit on sensitivity.

Thus the force vector on the bottom sawguide (where the blade exits from the sawcut) is useable in the invention as a leading process control signal such that corrective action (e.g., slowing of the feedspeed) may be implemented before material cut quality deterioration (either an "overthickness" or an "underthickness") of the lumber target is observed. Cut tolerances are improved with the inventive electromechanical sensor control systems, resulting in improved lumber yield per log.

Systems using F=K·D are first described. Subsequently in this disclosure, systems using a second derivative of the displacement motion are described. Systems using force transducer assemblies with sensors that are non-contacting, i.e., have no mechanical linkage joining a first probe member and as second target mass member on either side of the force measurement slot, but instead have first and second sensor parts that are in proximity to each other but not mechanically contacting across the slot, or have only a first member on one side of the slot. These sensor combinations advantageously are not cyclically bent or creased by motion at the slot.

Advantageously, force of the blade at the exit side of the cut line is a "leading indicator" of potential blade deviation. Cut deviation will propagate upward through the workpiece as the deviation increases, so by detecting force at the bottom of the cut, deviation can be stopped essentially before it starts, with no time lag for detection. Furthermore, the sensitivity to force is so high that an actionable output signal can be transmitted before blade deviation results in lumber size control issues. In other words, the control loop is reacting to changes in forces on the blade; not to actual measurable deviations from a "true cut line" such as would be measured with an optical system. Unlike the prior art, corrective 25 lanning is avoided and wood yield is increased.

Figure 2A:
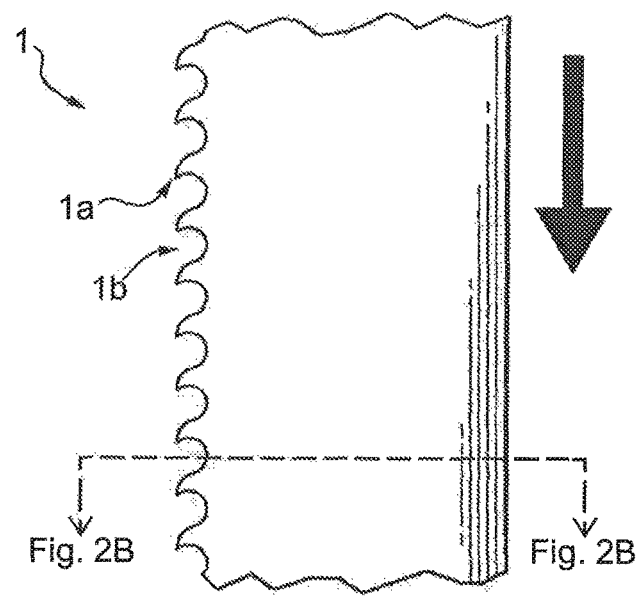
FIGS. 2A and 2B are views of a representative sawblade, showing the toothed structure, the gullet and the kerf width on which gullet fill is based.
Figure 2B:
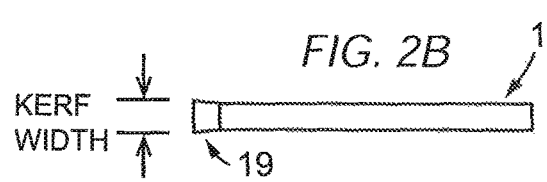
Figure 2C:
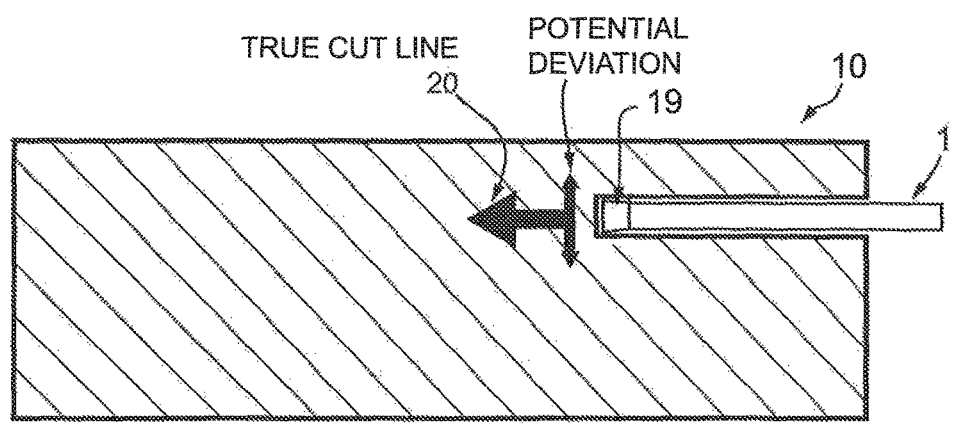
FIG. 2C is a schematic representation of a bandsaw blade with true cut line and any potential deviation or deflection when cutting through a workpiece.

FIGS. 2A and 2B are views of a representative sawblade 1 with a detail view showing a traditional tooth structure 1a, gullets 1b, and a kerf width at cross-section. Newer blades may have carbide teeth 19 with a characteristic wedge-shaped profile. The kerf width is established by the tooth, as shown in FIG. 2C, which is an idealized view of a bandsaw cut progressing along a cut line from right to left as shown through a workpiece 10. The feed direction is on a true cut line 20 (or "true cut condition") parallel to the flat of the sawblade, but a lateral deflection or a "potential deviation" of the blade may be to either side of a true cut.

During setup, in order to put a pre-load on the sawguides (3, 12), the sawguide front faces (3a, 12a) are forced against the blade 1 with jackbolts. Sawguide faces are also trued during routine maintenance to prevent twist of the blade. The guide face pressure on the electromechanical sensor during operation is then directly proportional to the saw tension and will vary as saw tension increases or decreases during a cut. The true cut line 20 is in-plane with the bandsaw and is plumb with a line between the sawguides. A deviation from a true cut is preceded by and driven by a force on the bottom sawguide.

FIG. 3 is a plot showing displacement contours of a rigid sidewall of a guide holder around a force measurement slot, the contour lines resulting from a load applied at a sawguide block 3. Contour lines of generally increasing displacement are indicated by dashed lines within the plate of wall 2b of the bottom guide holder 2. The guide holder is framed of welded steel plates having the required engineering stiffness, and is cut and shaped as shown with a conspicuous force measurement slot 4. Sawblade 1 is drawn edge on, vertically mounted in contact against the front face 3a of the bottom sawguide. The design loads the displacement or motion onto the upper edge of the force measurement slot. When blade 1 experiences a lateral deflection force (indicated here by bold double arrow at 1d) inside or outside the track of a true cut line, the sawguide 3 receives a corresponding force through directly contacting face 3a. The resulting deformation is propagated through the guide holder. While not bound by theory, force measurement slot 4 functions as a flexure hinge to focus the motion at a singular point of weakness in the wall(s) of the guide holder. Motion distributes in the guide holder across posterior wall segment 2c of the guide holder 2, and the resultant displacement motion is measured at the mouth 4a of the slot. The slot may be viewed as a lever arm with length L and the stress relief 4b or hinge point as a fulcrum. The upper aspect of the slot 4c proximate to the mouth 4a experiences a displacement (indicated by displacement contour line) but the bottom segment of the wall at 2d does not move, resulting in a relative motion of the slot walls. Thus an electromechanical sensor (a "motion sensor", sensu lato) mounted proximate to 2c may be configured to sense any motion across the force measurement slot at 4a and will output an essentially linear signal 5 to anti-deviation controller 6 (also termed a "process controller"). Any change in the output signal during a cut is proportionate to a change in force on the blade to one side or the other. Direction of forces on the blade are shown at 1d. Dust covers 2e and 2f are also shown in this view. Dust covers, gaskets and/or O-rings protect the electromechanical sensor inside the housing from particulate matter.

Figure 4A:
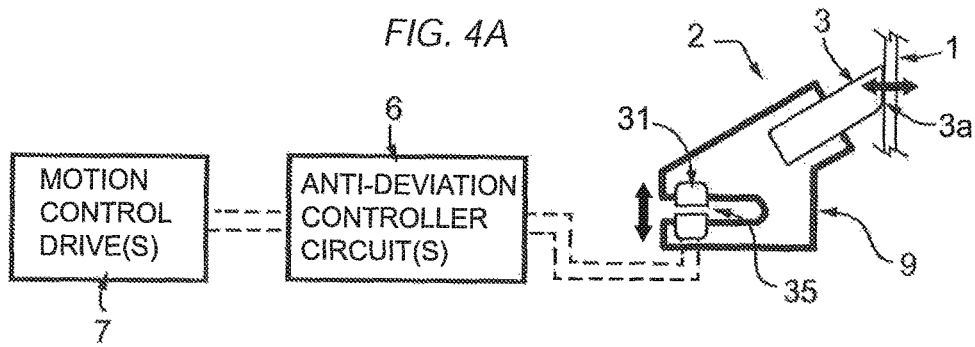
FIGS. 4A, 4B and 4C are schematic or block diagrams of force sensing devices containing one each of a family of electromechanical sensors, as are representative of a family of process control loops of the invention.
Figure 4B:
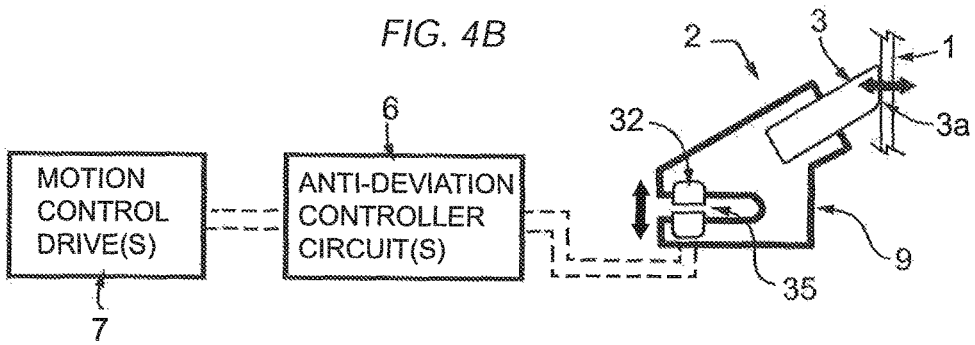
Figure 4C:
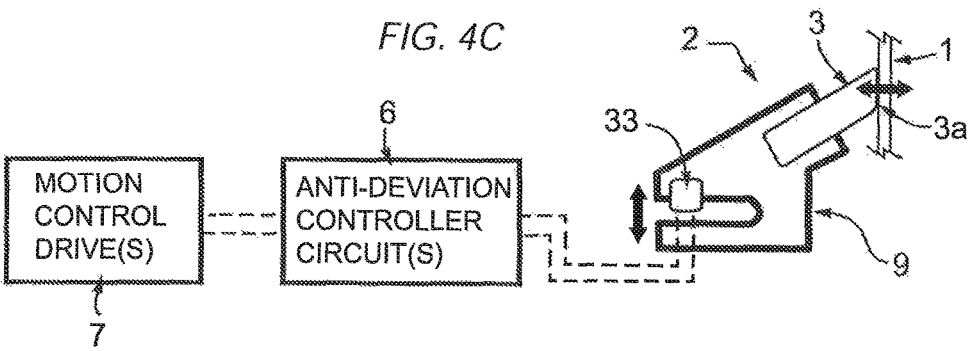
Figure 4D:
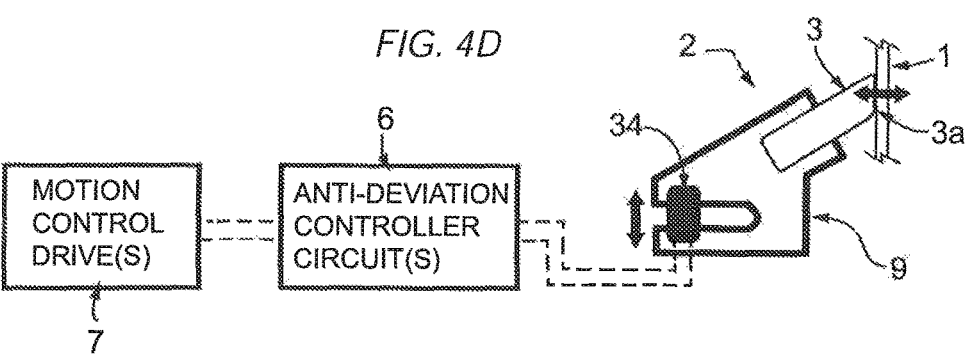
FIG. 4D is a block diagram of a contacting electromechanical sensor, presented for comparison.

FIGS. 4A, 4B and 4C are schematic or block diagrams of three alternative force sensing systems, as are representative of a family of process control loops. These will be presented in more detail below but are first described in a block view. FIG. 4A is exemplary of a guide holder with force measurement slot and force transducer assembly with capacitive motion sensor mounted therein. FIG. 4B is exemplary of a guide holder with force measurement slot and force transducer assembly with eddy current sensor mounted therein. FIG. 4C depicts a guide holder with accelerometer transducer assembly at the force sensing slot. For comparison, FIG. 4D shows a strain gauge assembly in a load cell that straddles the slot. Whereas the strain gauge is part of the mechanical stack joining the sawguide to the base of the guideholder, the capacitive sensor and eddy current sensor systems are proximity sensors and are non-contacting. Similarly, the accelerometer does not mechanically oppose deformation at the hinge of the slot. Thus FIGS. 4A, 4B and 4C are distinguished from the device shown in FIG. 4D and are termed here "non-contacting" force sensing or motion sensing systems.

As can be seen, downstream process control circuitry and process software are generally analogous. All systems use a functional block represented as "anti-deviation" or process control circuits" 6 and another functional block represented as "motion controller system(s)" 7 that coordinate motor and actuation functions of the bandsaw feed drives. The anti-deviation control circuits are configured to receive a signal 5 from an electromechanical sensor in transducer assembly (30, 31, 32), and to interpret that signal as a force vector with magnitude and direction so as to output commands to the motion control drive or drives that will reduce or counter any forces that would cause deflection or deviation from the true cut line. Motion commands are typically given with continuous feedspeeds (velocity) until a change in feedspeed is commanded, or in a motion profile with a start point and an end point with an acceleration velocity, and deceleration parameter defined for the motion profile. The systems are configured to do rapid iterations so that the motion control adjustments are made in essentially real time. These systems are now discussed in more detail.

Several embodiments of non-contacting electromechanical sensors are given by way of example. In FIG. 4A, a transducer assembly 31 with capacitive displacement sensor is shown. These sensors have the needed sensitivity, up to 100 kHz bandwidth, and are non-contacting, having a 4 to 6 mil gap between the probe head and the target. Suitable sensors are available with a driver module, calibration, offset, and linearization circuits, for example from Microsense (Tokyo, JP) or the C5 Capacitive Sensor package (Lion Precision, St Paul Minn.). The Microsense Model 6800 series for example, measures sub-nanometer displacement at 100 kHz in active sensing models and 20 kHz in passive sensing models. Capacitive sensors generally include a driver module that directs a cone-shaped alternating electric field at a target. The sensor can detect any change in capacitance between the sensor head and the target mass as a change in current flow that is a function of the capacitance of the electric field, which of course is a function of the separation distance of the positive and negative plates of the capacitor. A guard is used to shape the electric field into a cone shape so as to focus on the separation distance of a target mass so as to eliminate interferences. The target mass may be any conductive material. Changes in capacitance are readily output as a voltage, for example corresponding to 1.0V per 100 microns in displacement. Thus these sensors achieve a superior level of sensitivity in measuring micron and sub-micron displacements (with corresponding derivatives of displacement) matched only by delicate load cells, but are much more robust and durable. Any sensor of this kind is sensitive to dirt, so must be carefully shielded in a dust-proof secondary housing.

Advantageously, a preferred C5 sensor is about 4 mm in diameter at the head and requires about a 5 mil standoff so that shocks from the target mass do not impact the head. Sub-nanometer and picometer sensors are also available; thus the sensitivity is such that a force may be detected before a significant deviation can get started. Because the anti-deviation/motion control circuitry responds immediately to slow down the feedspeed, a very tight target for lumber size control is achieved. While target size control is associated with deceleration, overall throughput is actually increased.

In a preferred embodiment, the preferred capacitive displacement sensor type has a dynamic range of about 2 mils. The sensor is typically positioned with respect to the target surface at the center of the dynamic range and is zeroed with pre-strain on the saw so that negative and positive voltage outputs from the sensor correspond to blade forces away from or into the front face of the sawguide. The sensor is mounted straddling the force measurement slot and may be mounted so that the sensor is on one side of the slot and the target surface is mounted on the other. The sensor is anchored to one wall segment bounding the slot; the target surface to another wall segment on the opposite side of the slot. The orientation details are not critical to the operation of the invention, but accuracy is optimal when the target surface is perfectly smooth, the sensor is perpendicular to the target surface, the target is grounded, and electrical noise minimized. Zero adjustments are easily performed using software once the sensor position is roughed in. In fact, zeroing can be performed automatically between each saw cut. Temperature and humidity may also be compensated as needed. Response slopes are generally linearized over the specified dynamic range, and output signal ranges from zero to 10 VDC with a 100 Hz filter.

The electrical signal output is used as a process feedback signal by an anti-deviation control system, which generally includes an A/D converter. Lateral forces on the saw blade from the cut that exceed a desired limit may be corrected by slowing the feedspeed of the workpiece proportional to the over limit. When the force reduces below the limit the feedspeed may then be increased slowly to a point where the force/speed closed loop is balanced. Between cuts, the input from the electromechanical sensor is electronically zeroed and saved (as a "zero" offset) and can decrease (below zero) when the blade force changes laterally away from the guide or increase when the blade force is sideways (contralaterally) toward the guide, having a range from a positive to a negative value. Thus the zero signal represents only the pre-strain force on the guide. This is a simple description of a feedback control loop for control of feedspeed in a bandmill equipped with a non-contacting force sensing device and anti-deviation control system of the invention.

Other suitable non-contacting sensors include a next generation eddy current sensor in transducer assembly 32 (FIG. 4B). Eddy current sensor probes operate with an inductive coil and high-frequency AC excitation, and respond to passive magnetic current induced in a target surface as a function of proximity. Research has shown that coils excited at higher frequencies improve the proximity accuracy and sensitivity of the sensors. With suitable tuning, newer sensors can be adapted to measure position displacement in real time. As configured for measuring displacement, the excitation coil is generally anchored to the topside of the mouth of the force measurement slot (where guide force results in a displacement) and the heavier target mass is mounted and anchored on the rigid, static bottom side of the slot that is stabilized by the base of the guide holder and supporting frame of the bandsaw.

These newer eddy current sensors are "high performance" eddy current sensors and are distinguished from the low performance sensors that have served as low precision proximity sensors as known in the art. An example of a newer sensor is the ECL150 Eddy-Current Sensor (using a 1-2 MHz alternating current) available from Lion Precision. As intended here, high performance eddy current sensors are defined as those having at least a 1 MHz excitation driver and a sensitivity in microns or micro inches and displacement range of mils so as to improve measurement resolution. The higher precision is obtained using higher frequency coil excitation and improved magnetic coupling. Sensor output is dependent on the magnetic susceptibility and strength and frequency of the collapsing induced field. The sensors are improved now have sensitivity better than capacitive sensors. Advantageously, the coupled magnetic field is insensitive to foreign matter, but disadvantageously cannot be focused readily and extends radially about 300% of the probe head diameter. Thus probes are smaller than capacitive sensors for the same range. The magnetic field is generally toroidal around the coil. With these cautions, newer eddy current sensors may be configured as force slot displacement sensors for the anti-deviation control systems of the invention. With care in the design of the guide holder and mounting the sensor properly on a force measurement slot of the invention, improvements have resulted in sensor packages resulting in the needed signal output for high quality, lower lumber target size control programs.

FIG. 4C is a drawing of a third alternate embodiment. An accelerometer sensor package 33 is mounted on the active wall segment above the mouth of the force measurement slot 4a. With acceleration sensors of this type, the acceleration measurement is a direct measurement of the force on the saw from the relationship $F=MA$ which results in an anti-deviation feedspeed correction that can occur almost instantaneously, limited only by the capability of the motor to decelerate the workpiece. The accelerometer probe is mounted so as to respond to any acceleration of its mount.

Accelerometers contain a small mass which is disposed on a sensor to produce a voltage proportional to acceleration. When the accelerometer is moved infinitesimally, the small mass will produce a force proportionally to the rate of acceleration. There are many designs of accelerometers, most industrial piezoelectric designs have been tested and are not sensitive enough for this application. Aerospace designs with MEMS technology uses a torque motor to resist motion of the reference mass and uses the output supplied to the torque motor as the measurement of acceleration therefore no actual motion occurs and the measurement of acceleration is virtually instant. Motion virtually begins with acceleration disregarding jerk (the third derivative of displacement) when the mass is small. This may be the type of accelerometer the If the accelerometer is oriented in a direction associated with lateral movement of the saw blade, then the change in the acceleration measured will be proportional to the force on the blade.

Forces accelerating the blade (as associated with incipient deviation) are coupled to the force measurement slot in the guide holder. An electronic circuit in the accelerometer package is used to measure the amount of force on the internal reference mass. Because the reference mass of the accelerometer is known, the amount of force is readily converted to an acceleration value and output as a voltage. Double integration of the acceleration will provide a filtered quantitative measurement of displacement for a steady state force from the spring constant of the guide (F=KD), however the accelerometer will provide an almost instantaneous early direct measurement of the force magnitude and direction on the saw blade (where F=ma).

Surprisingly, the accelerometer may be mounted at the mouth of the force measurement slot without need to anchor a target surface or mass to the opposite side of the slot. The stiffness of the frame material and geometry of the slot ensures that forces (associated with flexion of the wall at the base of the slot) are primarily perpendicular to the slot and thus indicative of lateral force of the blade in the workpiece. In this embodiment, the force measurement slot is cut through sidewalls of the frame on both sides of the sawguide. The sawguide block is contacted to the blade at the leading tooth edge or butt back edge of the blade. Practice has shown that the leading edge of the blade is most relevant to the art of detecting and controlling forces, and the guide holder selects sawguide forces that are sideways to the plane of the sawcut. While not shown, capacitive or eddy current sensor measurement may be used in conjunction with accelerometric monitoring for displacement if desired.

Not all electromechanical sensors have the needed sensitivity and output, although more durable piezoresistive sensors may be achieved with further research. Low performance eddy current and inductive proximity sensors, including Hall Effect sensors, do not generally have sufficient sensitivity at this time. For comparison, FIG. 4D is a drawing of a contacting electromechanical sensor assembly 34, such as a strain gauge or a "load cell" of the foil or piezoresistive type, typically mounted in a Wheatstone bridge or integrated circuit package. Deformation of the strain gauge results in an output signal and may lead to device failure with repetitive motion. Physical contact between the sensor head and a mechanical member of the bottom guide holder is indicated by double-headed arrow 35, which identifies a mechanical stack or linkage between the two. This figure summarizes one or more of the detailed embodiments described in U.S. patent application Ser. No. 14/556,139 to Myrfield. While generally, any electromechanical sensor may be used, load cells are limited by poorer tolerance of the resistive circuit elements to vibrational and cyclical deformation, having a relatively short survivability in the harsh environment of a bottom sawguide and guide holder.

Figure 5A:
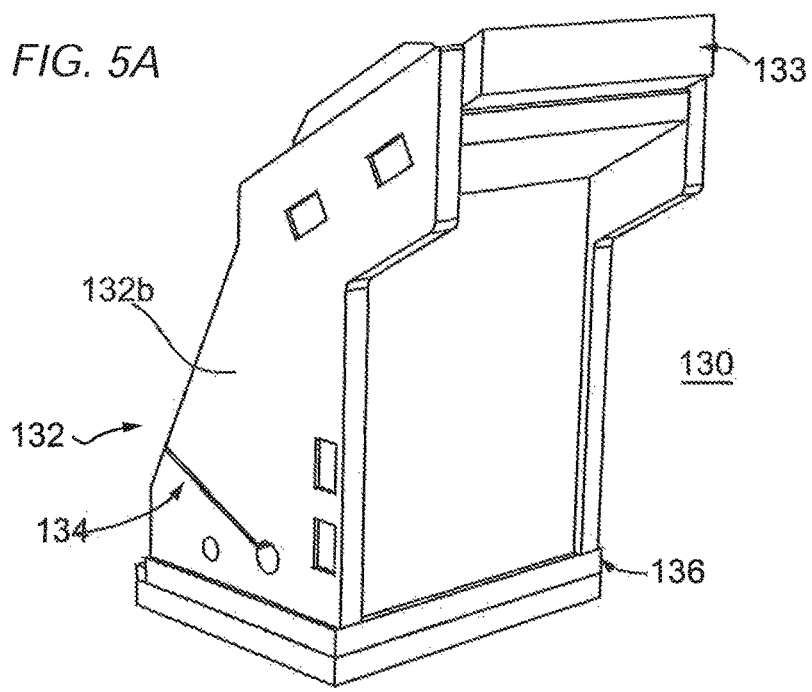
FIGS. 5A and 5B are perspective views of a sawguide and guide holder with non-contacting capacitive sensor as configured for operation with an anti-deviation control system of the invention.
Figure 5B:
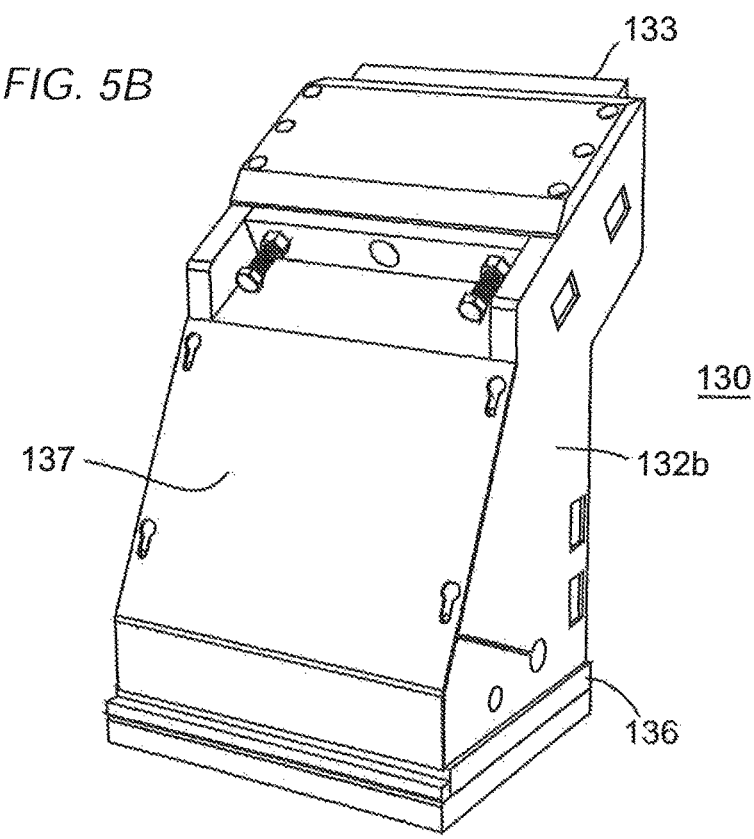

FIGS. 5A and 5B are external views of a first embodiment 130 of a sawguide and guide holder housing for a non-contacting capacitive electromechanical sensor. The electromechanical sensor is configured for operation with an anti-deviation feedback loop control system of the invention. Visible from the exterior are a sawguide block 133 supported between framing members or sidewalls 132b of the guide holder 132. FIG. 5B shows the guide holder with an exterior back dust cover 137 in place. In operation, dust covers are used where needed to protect the electromechanical sensor assembly and force measurement slot 134 from accumulating wood solids or tar during day-to-day operation. Any wire harness ports are also sealed.

Figure 5C:
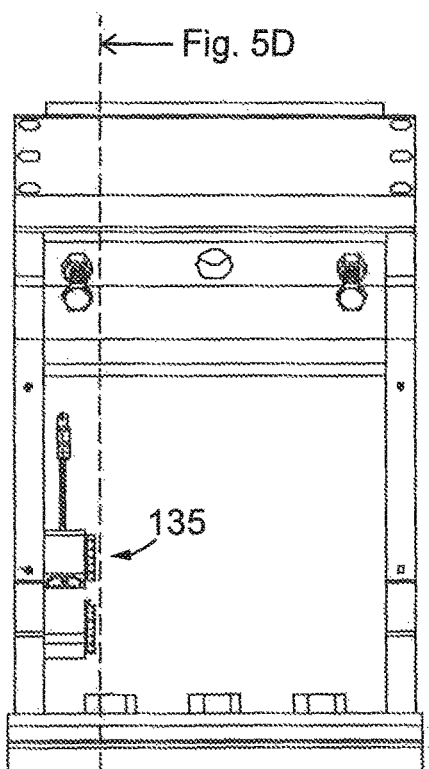
FIG. 5C is an isometric rear view of a sawguide and guide holder with non-contacting capacitive sensor.
Figure 5D:
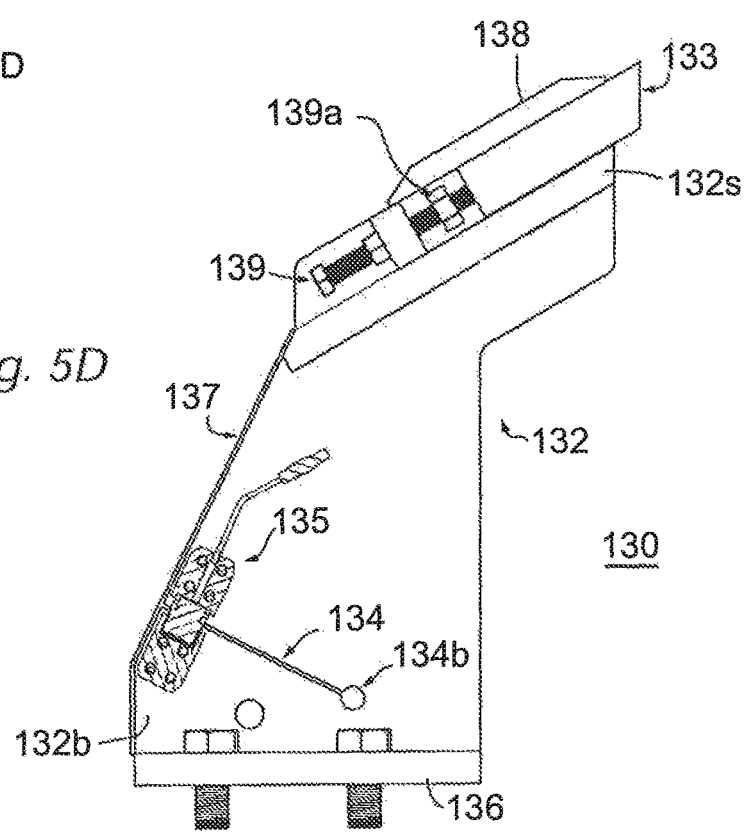
FIG. 5D is a cutaway cross-sectional elevation view showing the sensor and sensor cell spanning the force measurement slot.

FIGS. 5C and 5D are isometric views of a sawguide and guide holder with internally mounted non-contacting capacitive sensor assembly 135. Shown are internal features in cutaway view FIG. 5D. Force transducer assembly 135 with non-contacting electromechanical sensor is shown straddling force measurement slot 134. The force measurement slot 134 is sized to maximize sensitivity and linearity while resisting failure; and when properly configured, the touch of a hand on the guide can activate a voltage output from the sensor. The slot is a full-thickness cut through the supporting guide holder sidewalls or frame member 132b.

Also shown in this section are base 136, sawguide bracket 132s, sawguide 133, sawguide coverplate 138, and sawguide adjustment jackbolts 139 with locknuts 139a. FIG. 5E, shows the major sub-assemblies in exploded view. This view emphasizes the rigid welded frame 132 of the bottom guide holder, which consists of two sidewalls and cross-struts for supporting and tensioning the sawguide and a base for mounting the guide holder on the bandmill.

Sawguide "block" 133 is mechanically linked to the guide holder. It rests in a channel or bracket 132s and is held in place by coverplate 138. The mount includes one or more jackbolts 139 for precise position adjustment and for pre-tensioning the sawguide against the blade. The sawguide may be removed for periodic re-facing of the block face and/or changing of a sawblade. The guide holder assembly is typically provided with an integral mounting plate 136a that seats on shelf 136 so that the entire unit may be bolted to the bandmill to aid in removal during blade changes if desired.

The sidewalls of the guideholder are deliberately weakened by a mid-level discontinuity or full-thickness slot cut that defines a "force measurement slot" 134. Surprisingly, although steel is a stiff material, by selecting the length and aspect ratio of the force measurement slot 134, the radius of the stress relief hole 134b, and the frame thickness, sensitivity to very, very small deformations of the bottom sawguide are achieved—such that a hand on the sawguide 51 can result in a readily measurable change in the electrical signal from the electromechanical sensor even when the sawblade is tensioned under 10,000 pounds of pull force.

As shown here, the frame 132 has a superior aspect supporting the sawguide mounting bracket 132s, an inferior aspect rigidly joined to a "base" plate 136, an "anterior aspect" facing the saw blade, and a "posterior aspect" with internal cavity for housing the force transducer assembly and sensor. The base of the frame includes attachment means to the bandmill. The posterior cavity may be formed by one or more reinforcing or bracing members (132*b*) disposed as sidewalls on the frame, (i.e., a shoulder or edge member forming a "sidewall" of the frame that extends anterioposteriorally from the front face of the sawguide). "Anterior" and "posterior" lateral aspects are taken with reference to the "front" defined by the front face of the saw guide.

The force measurement slot divides the framing members or sidewalls into a superior section 132*c* and an inferior section 132*c*. The lower frame section is rigidly contiguous with the baseplate 136*a* of the holder; the upper frame section is rigidly contiguous with the sawguide mounting bracket 132*s*. The two sections may flex or "breath" at the mouth 132*a* of the force measurement slot, which is pre-strained during setup by biasing the sawguide against the blade with jackbolts 139.

Note that any change in the sawguide tension results in a small change in the width of the slot 134 and is communicated the electromechanical sensor package 135. The slot extends from a mouth 134*a* in the front face of the framing member to a junction 4*b* of upper and lower aspects (2*c*,2*d*) such that the aspect ratio and dimensions of the force measurement slot are configured to distribute flexural displacement in said framing member to the mouth, where the electromechanical sensor is placed. The mechanical stack is thus not rigid, but flexes at the slot, and the slot is a dynamic part of the coupling or linkage (direct or indirect) joining the sawguide to the electromechanical sensor.

In this preferred embodiment, the slot is straddled by force transducer assembly (135, FIG. 5E) with capacitive sensor mounted near mouth 134*a* where displacement is greatest. A wire harness (135*a*) connects the capacitive sensor output to a processor or an A/D converter of an anti-deviation feedback loop and motion control circuit.

Figure 6A:
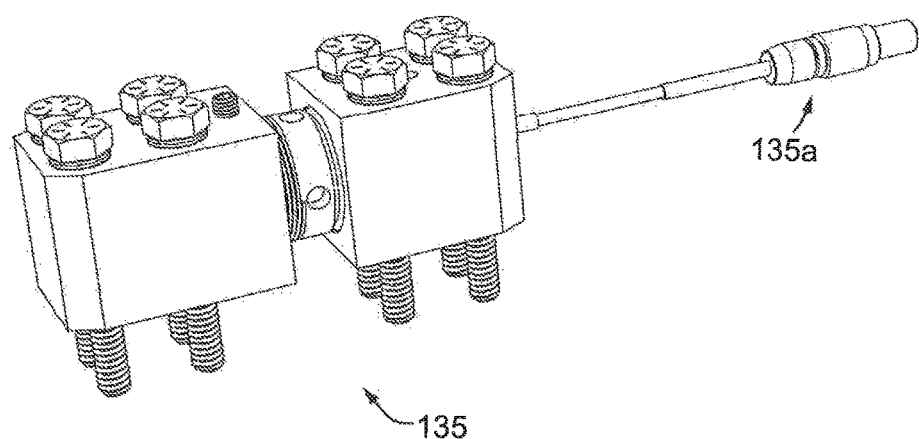
FIG. 6A is a perspective view of a sensor cell assembly with wire harness.
Figure 6B:
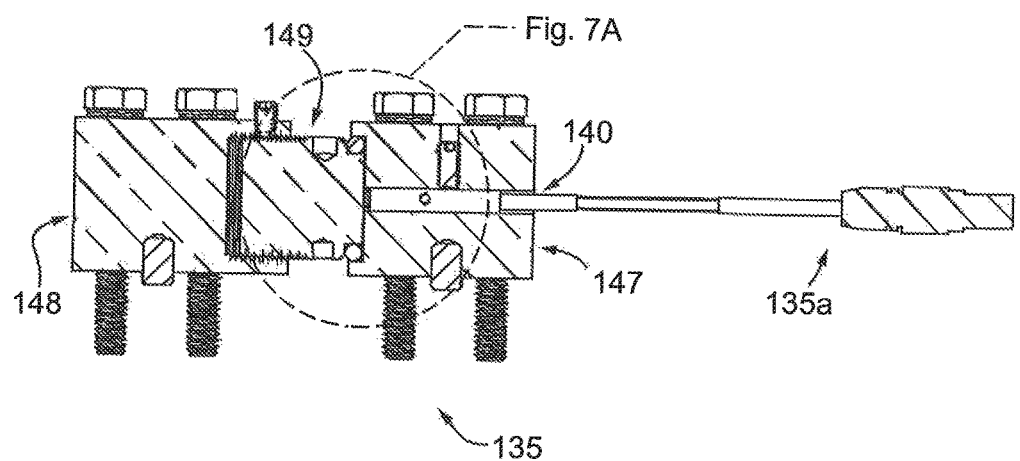
FIG. 6B is a cross-section view down the midline of a first sensor cell of the invention.

FIG. 6A is a perspective view of a transducer assembly and capacitive sensor cell 135 with wire harness 135*a*. Eight bolts secure the sensor cell or "package" assembly to a wall of the guide holder proximate to the mouth of the force measurement slot. "Top" and "bottom" blocks (147, 148), each with four bolts, are bridged by a cylindrical piston member 149 that mounts rigidly in the bottom block, as shown in more detail in sectional view (FIG. 6B). The upper butt end or head of the piston member 149 is fitted into a piston receptacle in the top block 101, and a force transducer is captured between the piston head and the piston receptacle. As the force measurement slot flexes, the piston reciprocates in and out of the piston receptacle, causing the piston member, also termed here a "target", to vary in capacitance when acted on by the capacitive probe. Alternating current through a coil drives an electrical field between the probe head and the target, the capacitance of which is very sensitive and proportionate to any change in separation or displacement of the target from the probe head.

Figure 7A:
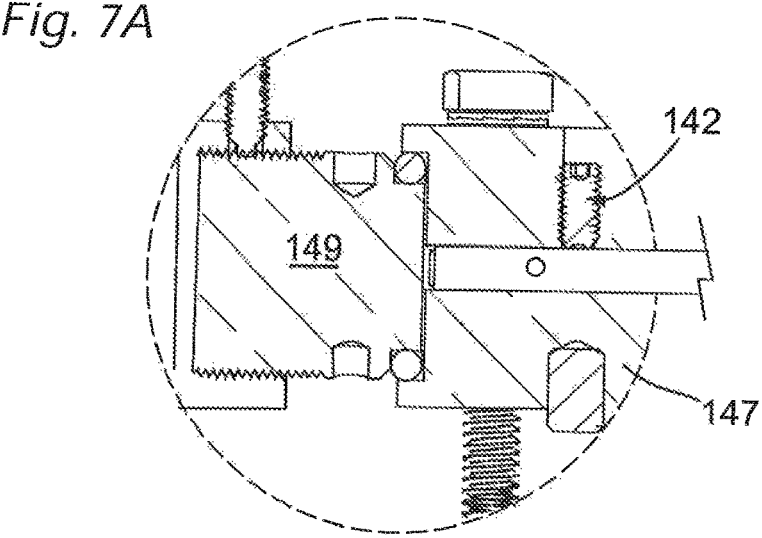
FIGS. 7A and 7B are detail views of the internal structure of a capacitive sensor cell assembly.
Figure 7B:
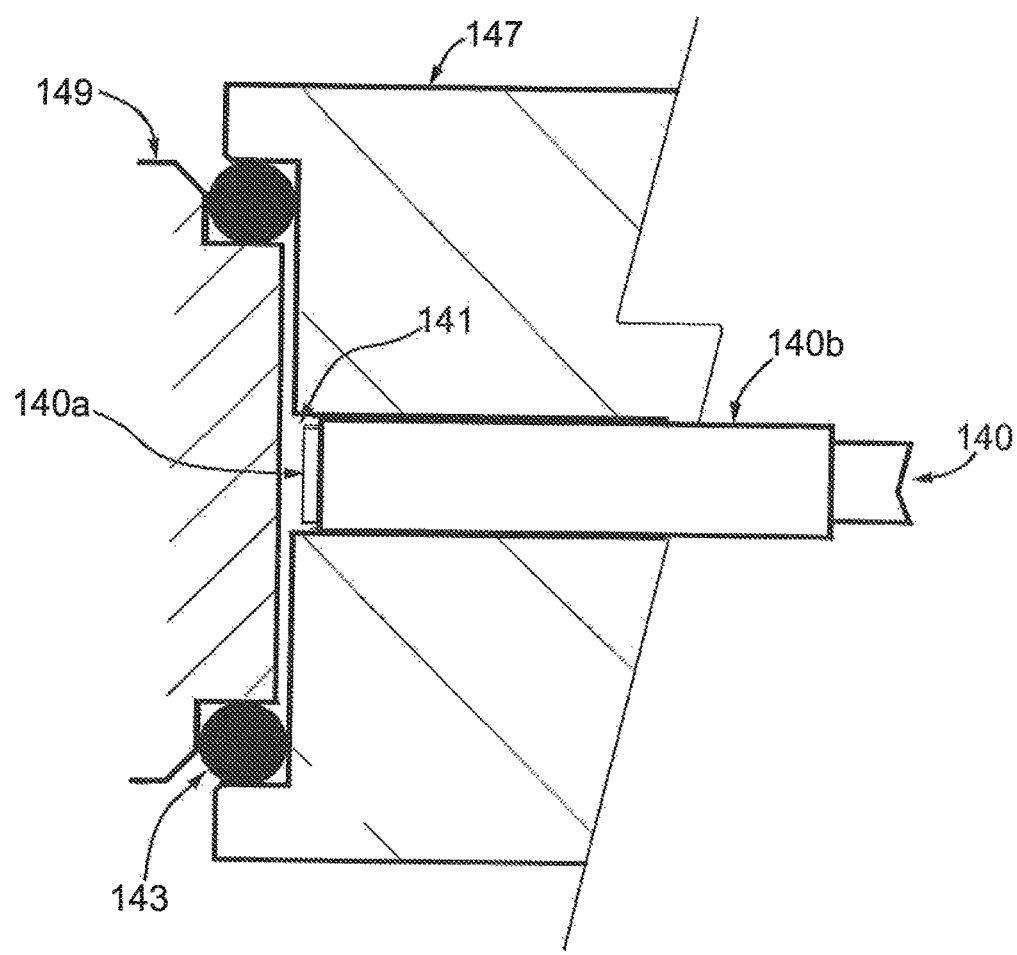

More detail is shown in FIGS. 7A and 7B. The capacitive probe 140 is seen to have a probe head 140*a* mounted on a cylindrical body 140*b*. Target mass 149 is separated from the probe head by a gap 141. Typically this is about 5 mils. The actual motion of the target mass in and out of the gap may be ±1 mil or less, a very small change, but the electronics are set up in the sensor to output a signal having a dynamic range of 10 V. Typically the sensor is pre-strained to rest at the center of the dynamic range. A setscrew access portal 142 is also shown. An O-ring 143 provides an extra seal against dust and vapor that penetrates the guide holder.

Figure 8:
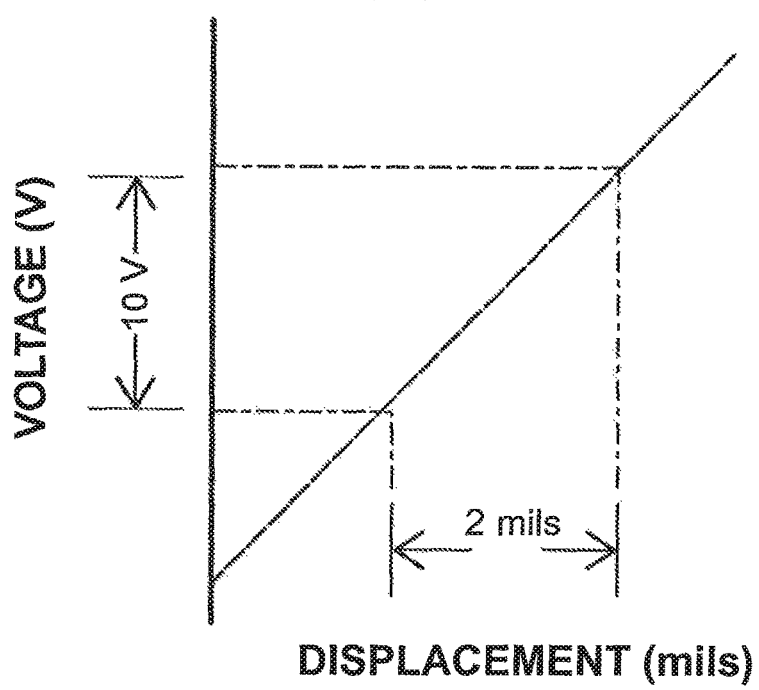
FIG. 8 is a representative plot of output from a first electromechanical sensor in which the sensor has been pre-strained and zeroed so that voltage is zero at midrange.

FIG. 8 is a representative plot of output from a first electromechanical sensor in which the sensor has been zeroed so that voltage is zero at midrange. The dynamic range is typically configured to be no more than 2 mils and the output voltage 10 V over that range. The offset is typically about 5 mils. More sensitivity is readily achieved, and the configuration described is what is currently practiced and is not limited thereto.

Figure 9:
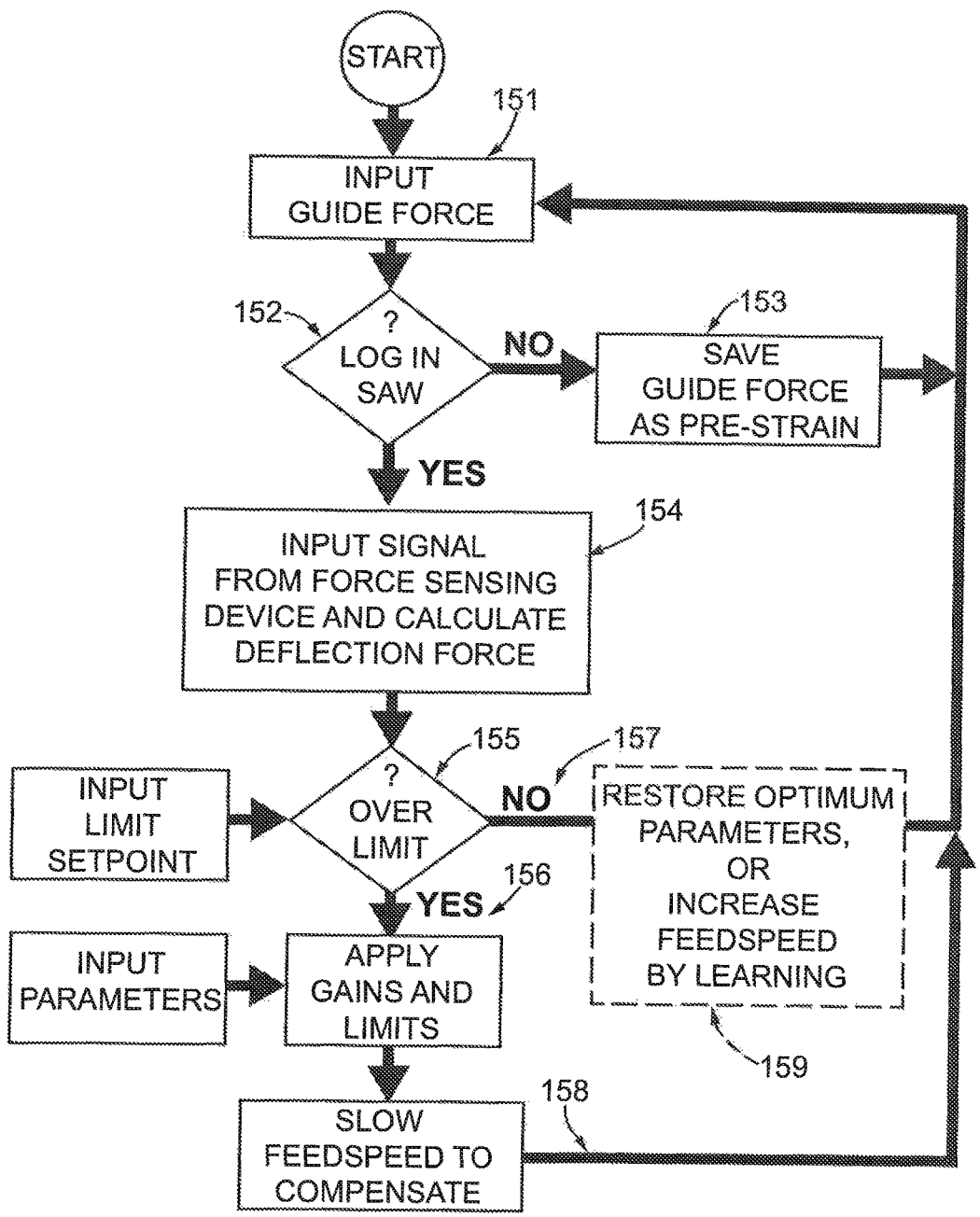
FIG. 9 is a schematic block diagram of components of a first software package used in non-contacting capacitive anti-deviation feedback control of feedspeed.

FIG. 9 is a schematic block diagram of components or steps of a process flowchart, including elements of a software package 150 or firmware used with a computer or any processor-implemented logic circuit for anti-deviation feedback control of workpiece feedspeed.

In general terms, the flowchart is designed to show how a process control method is implemented, where the primary input 151 is a real time measurement of a force or pressure on a sawblade, the force measurement signal being used to sense and correct any incipient deviation from the ideal or "true" cut path through a workpiece, taking into account wood condition, mechanical factors in the saw and carriage, blade condition, and energy consumption.

The guide force may represent a pre-strained condition or may represent a cutting condition when a log is in the saw. The process logic will assess whether a log is in the saw ("?", 152). If NO, the force signal is digitally zeroed (153) as an index of sawblade bias (i.e., a pre-strain) and save the zero force signal as an offset. If YES, the process logic will monitor the electromechanical sensor input and assess any incipient deviation from a true cut 154 by detecting changes in the digitized force sensing signal less the zero offset (155).

The process logic is configured to enable:
a) a "zero set state" wherein the sawguide is elastically pre-strained in compression by the physical offset of the sawguide against the blade and digitally zeroing the electromechanical sensor electrical signal; and,
b) a "force detection state" wherein the force measurement slot is elastically compressed or relaxed in real time according to a force associated with a lateral deflection or sawing resistance of a pre-strained sawblade against or away from the front face of the sawguide during a cut and the electrical signal may range around zero from a positive value to a negative value.

The anti-deviation control logic is configured to have a static zero output between cuts and a positive or negative dynamic output if a deflection force is evident during a cut. The method involves generating a signal from the electromechanical sensor (generally positioned where deflection of the blade starts at the exit from the cut), and digitizing the signal, generally with an A/D converter such as may be part of the transducer package or may be included in an anti-deviation controller circuit. Because the pre-strain is zeroed in the controller, any absolute force (to the left or right, or a tensioning of the blade due to sawing resistance) is anticipated in the force data, and a corrective adjustment is made to workpiece feedspeed by issuing an instruction that is processed by a motion controller. The instruction may be to slow the feedspeed or increase the feedspeed. At least one feed axis of motion is monitored and a motion controller operates a motion drive or drives according to the signal received from the anti-deviation control system.

The logic decision locus ("?", 155) to output a workpiece feedspeed adjustment (in the case of a negative feedback control loop by slowing feedspeed) is made by comparing an input force limit setpoint and applying (if over limit=YES, 156) a reductive adjustment in feedspeed according to gains and limits supplied to the program. Sudden process changes, such as when the blade encounters a knot or a twist in the wood grain will also cause the controller to back off feed rate for an instant, and then ramp back to maximally achievable feedspeed as soon as conditions permit, thus operating as a feedback loop (process arrows as closed loop). Following any adjustment, the guide force input is re-assessed. If no adjustment is needed (overlimit=NO, 157), the process is repeated beginning at 158 as long as needed. The process 150 is continuously iterated for effect during a cut and can be repeated at an effective repetition rate for optimizing true cut accuracy and feedspeed throughput.

Once the incipient deviation is corrected, feedspeed may be returned to its programmed optimum or increased by a learning algorithm 159, and for example is often advantageously controlled (absent any forces) by a depth-of-cut subroutine or program also operatively linked to the motion controller. Thus the anti-deviation controller may act to improve, modify, override, or refine the action of other controller systems as will be described below.

Means for determining a workpiece feedspeed adjustment output generally include logic means involving a processor or "computing machine" having supporting circuitry and logic instructions (either as software, firmware, or field programmable gate array) configured to compare a change (dx/dt) in an electrical signal input against a setpoint, window or upper and thresholds, and to output the feedspeed adjustment according to parameters established in programming, or according to learned experience gained in making similar cuts with a similar or equivalent saw, taking into account also wood conditions, blade conditions, and so forth. Each feedspeed adjustment is followed by an iteration that refines the adjustment in real time until forces are within limits and a true cut line is maintained. Means for directing a motion drive mechanism operative on a workpiece generally include an X-Y, an X-Y-Z, (or any equivalent system based on polar coordinate's), motion controller having at least one positional coordinate such that any feedspeed adjustment from the anti-deviation control logic is converted into an instruction having parameters of time and space, where that instruction is carried out by a mechanical drive responsible for motion of the workpiece relative to the sawblade. The motion controller system may include more complex operations such as subroutines for acceleration and ramping of the workpiece and power limit subsystems. Process control is generally a digital operation having analog inputs and outputs.

A positive feedback subroutine may also be applied 159, so that feedspeed may be increased by an offset when conditions are favorable and gullet fill is not exceeded. Positive and negative feedback loops may be combined and may operate cooperatively with feedspeed control by depth of cut, gullet fill, or log modeling as described in FIG. 16.

By use of the inventive systems and methods, advantageously, reaction time of a human operator is less of a factor, over-correction and under-correction are reduced, and a significant gain in overall productivity is achieved. Corrections made based on sensor output may be processed at a rate limited only by the clock speed of the processor, and thus the operation of the blade on the workpiece may be adjusted by the motor drives at an essentially instantaneous rate and limited only by the horsepower of the motors.

When cutting with multiple blades, the guide force is monitored and a calculation is made so as to combine one or more force measurements from one or more sensors, generally one per blade of a twin or quad bandsaw, such that the system will react to the greatest force sensed at any instant by any of the sensors.

In a preferred embodiment, the electromechanical sensor may be a capacitive electromechanical sensor, and the force sensing circuit is configured to perform a capacitance zeroing function under no load between cuts. Capacitive sensor cells illustrate the operation of a feedback control system with a sensor directed at forces measured as the saw tooth exits the workpiece. Force is results in displacement at a force measurement slot cut in the guide holder frame and is resisted by the spring force of the framing members, allowing measurement of very small displacement at the mouth of the slot. In other embodiments, the electromechanical sensors are the same as those employed in accelerometers relying on solid state MEMS construction and having no moving parts. With electromechanical sensors of this type, the force resulting in a feedspeed correction can be almost infinitesimally small and fast.

The invention includes representative process control systems disclosed here. Generally as claimed, disclosed is a bandsaw process control system comprising a) a top sawguide 12 and a bottom sawguide 2 configured to pre-strain a bandsaw sawblade 1 under an applied constant force that defines a true cut condition 20 when operated in contact therewith, the sawblade having a direction of rotation in use from top to bottom through a workpiece; b) a bottom guide holder 3, 170, 220, configured to support the bottom sawguide, the bottom guide holder comprising a support frame having at least one flexural mode configured to undergo an deformation when subjected to an change in one or more forces on the sawguide as received from the bandsaw sawblade; c) a force transducer assembly, the force transducer assembly (comprising an electromechanical sensor) operatively disposed on the frame so as to output a signal to a process controller in response to the change in one or more forces on the sawguide; and, d) wherein the process controller is configured to receive the signal and cause a process control reaction efficacious in restoring the true cut condition, thereby closing a process feedback control loop based on force measurement at the bottom sawguide.

Yet more generally, the apparatus and methods of the invention are embodied by incorporation of the a) electromechanical sensor, b) anti-deviation control subsystem, and c) motion controller subsystem with motion drives, into a "feedback control loop" enabled to i) reduce workpiece feedspeed in order to counter, reduce, or oppose an overfeed condition or an overpower condition, and ii) enabled to increase or maximize workpiece feedspeed when change in force on the blade is not significant, thus correcting any deviation to a true cut condition on the fly.

Figure 10A:
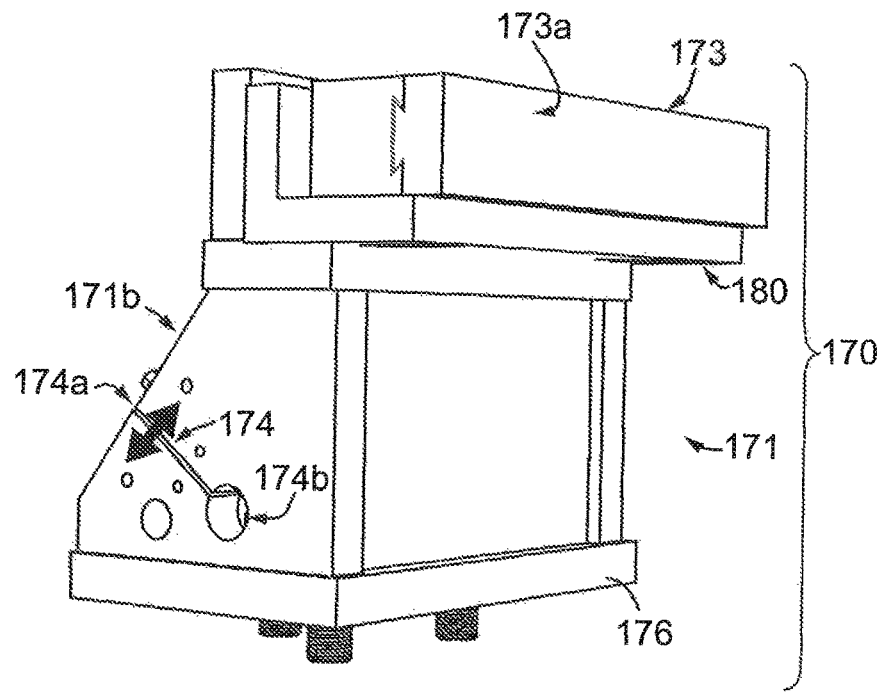
FIGS. 10A and 10B are perspective views of yet another guide holder embodiment of the invention.
Figure 10B:
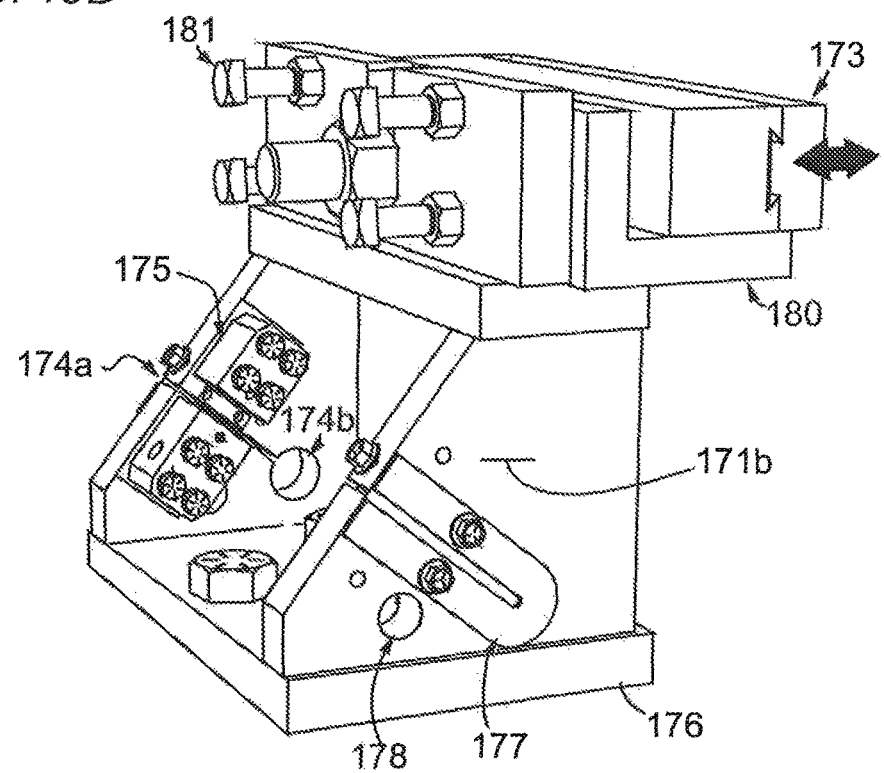

FIGS. 10A and 10B are perspective views of yet another guide holder and electromechanical sensor embodiment 170 of the invention, the guide holder housing 171 having an force transducer assembly 175 with sensor operatively coupled to the sawblade through bottom sawguide 173. Here the sawguide front face 173a is essentially normal to the sawblade and is mounted in a detachable rail or support bracket 180 that is removably mounted to the guide holder 171, such as by bolts 181. The ability to detach the sawguide support bracket aids in routine maintenance such as re-facing the sawguide and blade replacements. In addition, the dimensions and shape of support bracket 180 and framing members of the guide holder may be customized to fit a customer's bandmill. However, adjustments in the lever arm of the support bracket relative to the base may require analysis of deformation distribution in the wall materials and engineering of the dimensions of the force measurement slot 174 (compare FIG. 10A with FIGS. 3 and 1B). In this case, the differences in deformation necessitated by the smaller lever arm and the essentially right angle bend of the guide holder frame cause the slot to be configured so as to almost bisect the wall from side to side. The slot 174 is a full-thickness cut through the sidewall 171*b* and extends from a mouth 174*a* at the posterior edge of the sidewall of the frame almost to the front bottom corner at the base 176. The aspect ratio of the slot is calculated so as to achieve an effective displacement on the electromechanical sensor assembly (175, shown in FIG. 10B straddling or seating on the slot). Thus the distribution of displacement around the force measurement slot is an engineered feature of the guide holders of the invention and is a technical advance in the art.

Compression or relaxation of the force on the sawguide (173, double-headed bold arrow) is translated into flexion of the guide holder frame or walls at stress relief hole 174*b* and at the mouth (174*a*, double headed bold arrow). Flexion of the sidewalls 171*b* at the mouth follows an elastic modulus of the frame material (generally steel). Stress relief 174*b* prevents uneven concentration of flexion loads. The sensor is preferredly a non-contacting eddy current electromechanical sensor and is mounted in force transducer assembly 175, straddling the force measurement slot. The sensor may include on-board driver, linearization and filter circuitry or may be a passive capacitive sensor, and is connected by a wire harness (not shown) to an anti-deviation controller as described above.

Not shown is a dust cover extending over the electromechanical sensor cavity. Dust covers 177 protecting the force measurement slots are mounted bilaterally. The exit 178 for the wire harness is generally blocked with a bung so that the internal cavity is not exposed to particulate matter during and operation except when maintenance is needed.

Figure 11A:
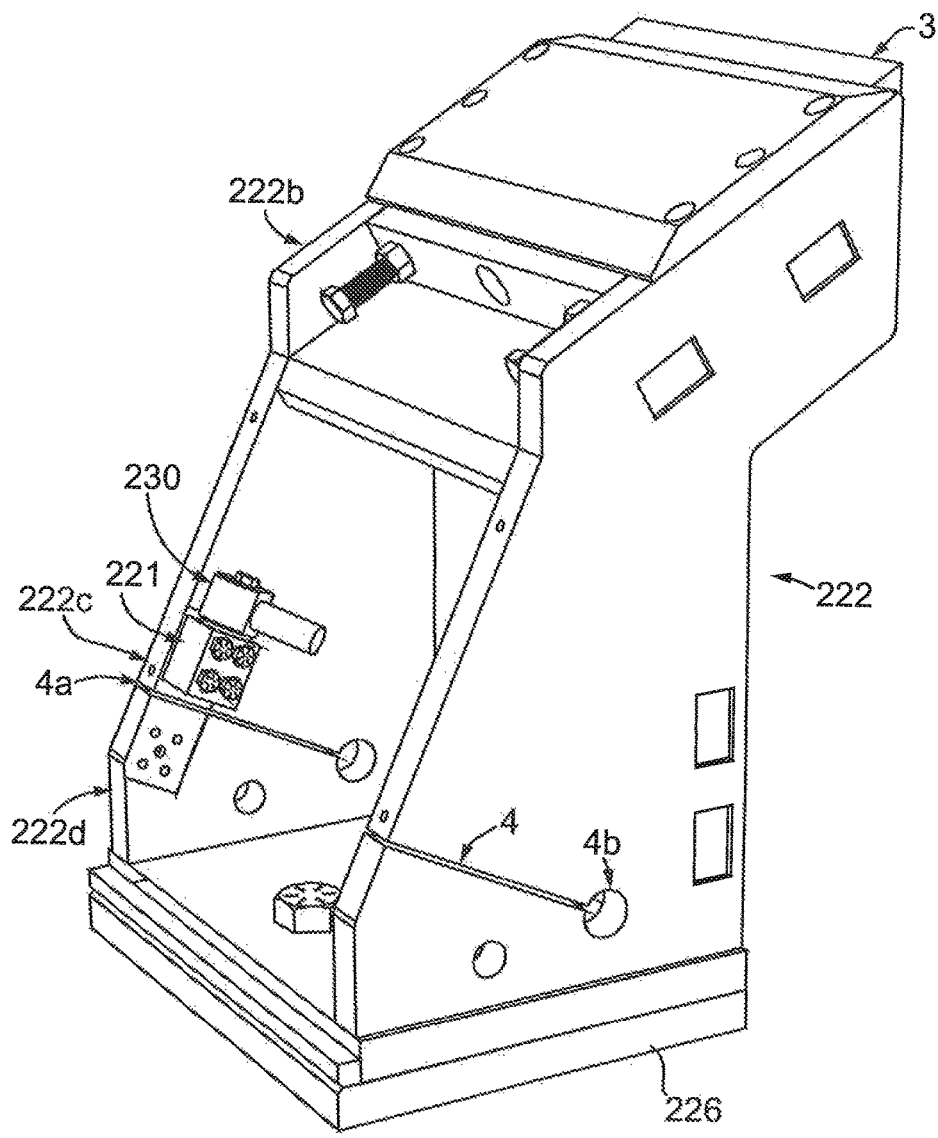
FIGS. 11A, 11B and 11C are three mechanical views of a guide holder and sensor assembly of a second embodiment of the invention.
Figure 11B:
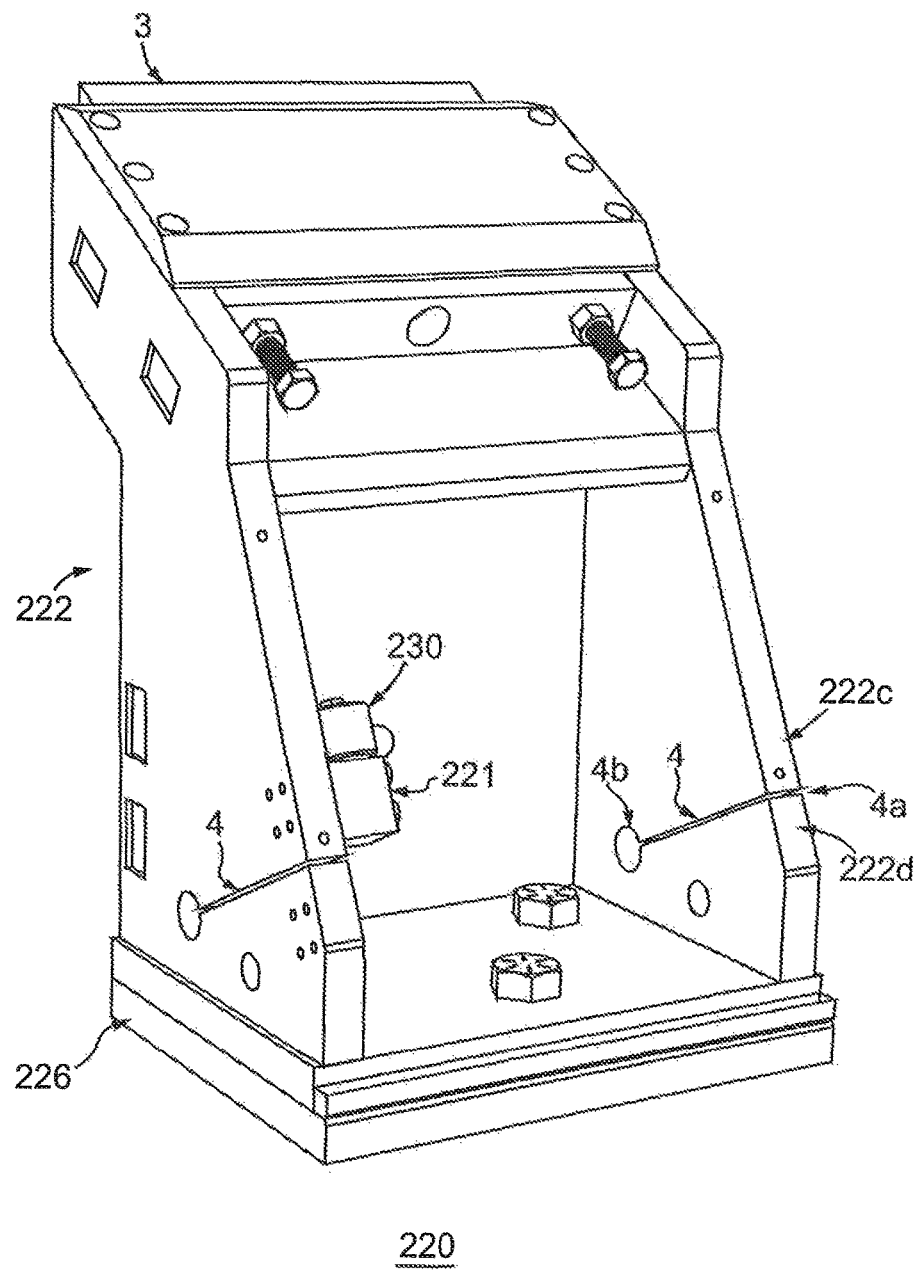
Figure 11C:
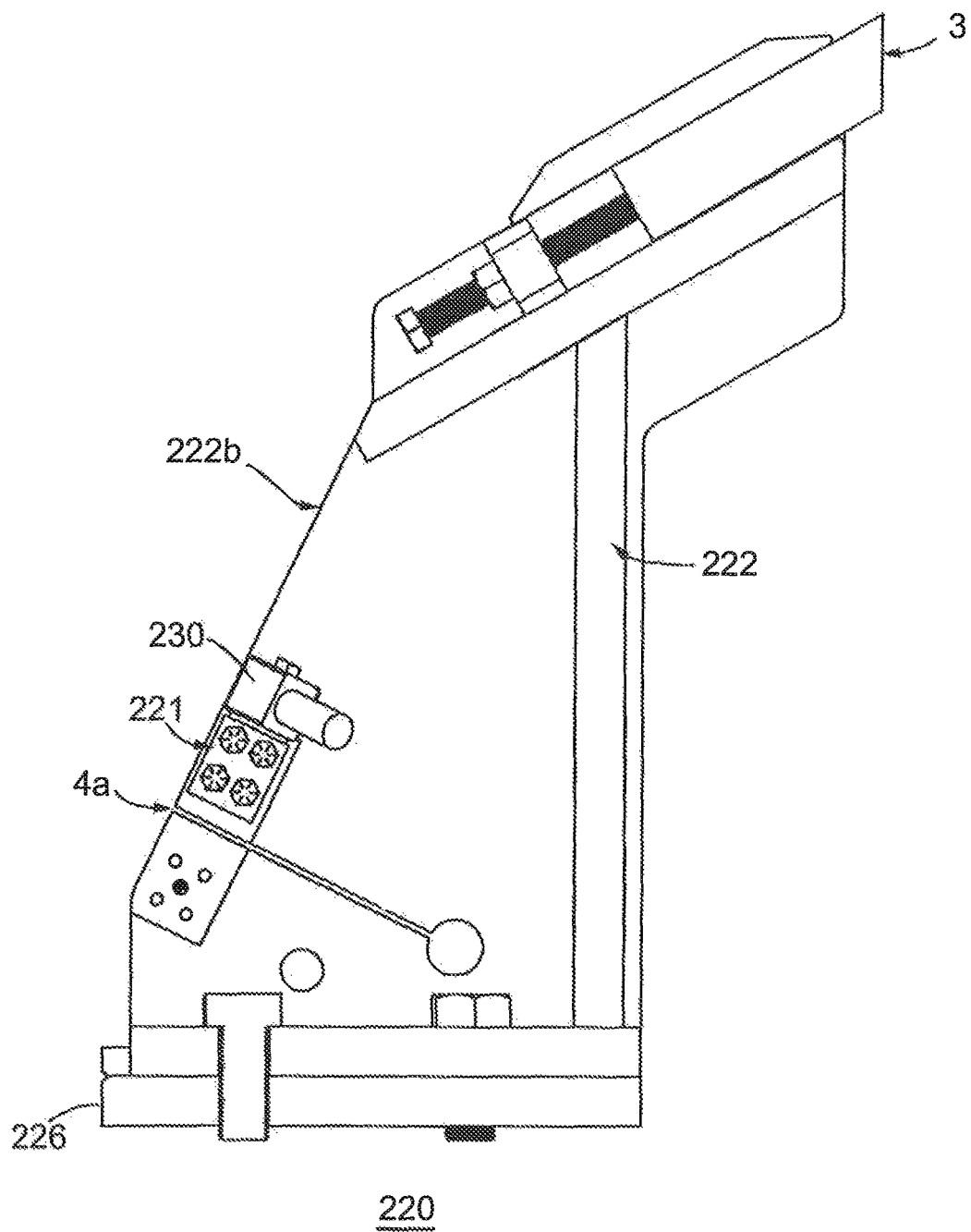

FIGS. 11A, 11B and 11C are three mechanical views of a guide holder and sensor assembly of another embodiment 220 of the invention. The guide holder 222 is essentially that shown in the previous FIGS. 5A through 5E, and has the same pattern of bolt holes for rigidly attaching an electromechanical sensor to the side wall and for rigidly attaching the guide holder base 226 and framing members 222 to a bandmill. However, in this instance an accelerometer 230 is mounted on an adaptor block 221 that attaches only to the wall 222*b* above the mouth 4*a* of force measurement slot 4. Deflection forces propagating from the sawguide 3 through the guide holder are experienced by the accelerometer indirectly through the adaptor. The walls and cross-struts (framing members, 222) of the guide holder are engineered from a material having a stiffness configured to transfer a force from the sawguide to the electromechanical sensor. The force measurement slot divides the sidewalls 222*b* into two sections (222*c*, 222*d*) such that force-associated displacement is concentrated in section 222*c*. The accelerometer mass and spring assembly is sealed within a dust-tight sensor package 230 that bolts on to the adaptor block and is not in direct contact with the guide holder. A wire harness, not shown, outputs a signal from the accelerometer to an anti-deviation control system as described above. FIG. 11C shows the construction as viewed in a cutaway section through the framing members.

Figure 12A:
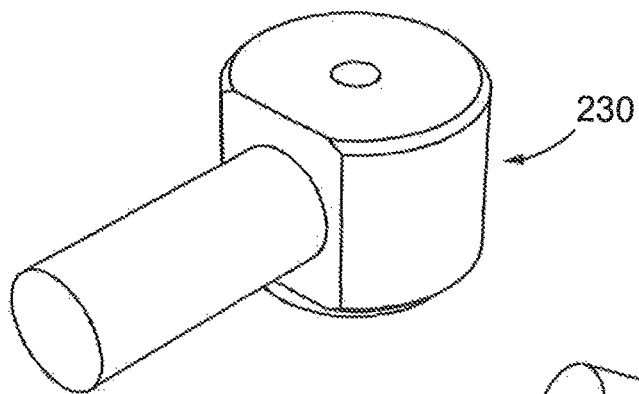
FIGS. 12A through 12D are views of a solid-state accelerometer sensor.
Figure 12B:
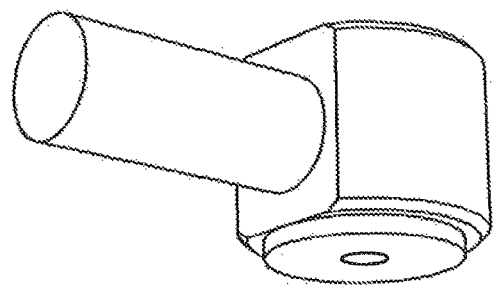
Figure 12C:
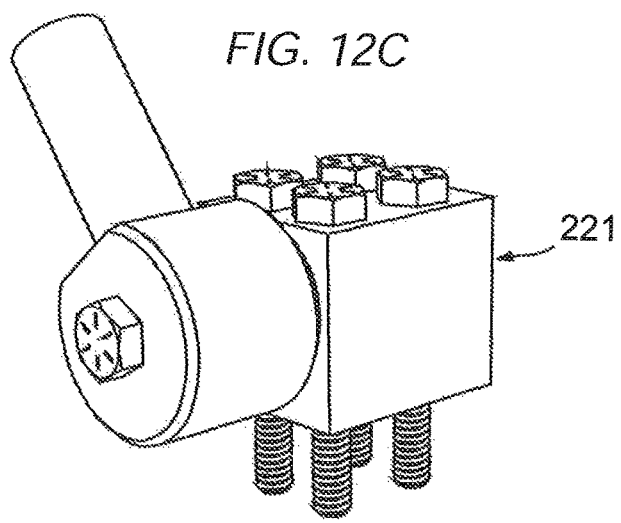
Figure 12D:
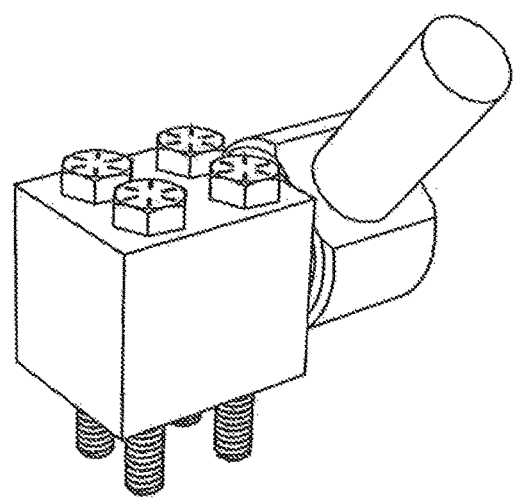

FIGS. 12A through 12D are views of a solid-state accelerometer sensor. FIGS. 12A and 12B show the accelerometer assembly; FIGS. 12C and 12D are views of the sensor with a 4-bolt mounting adaptor.

Figure 13:
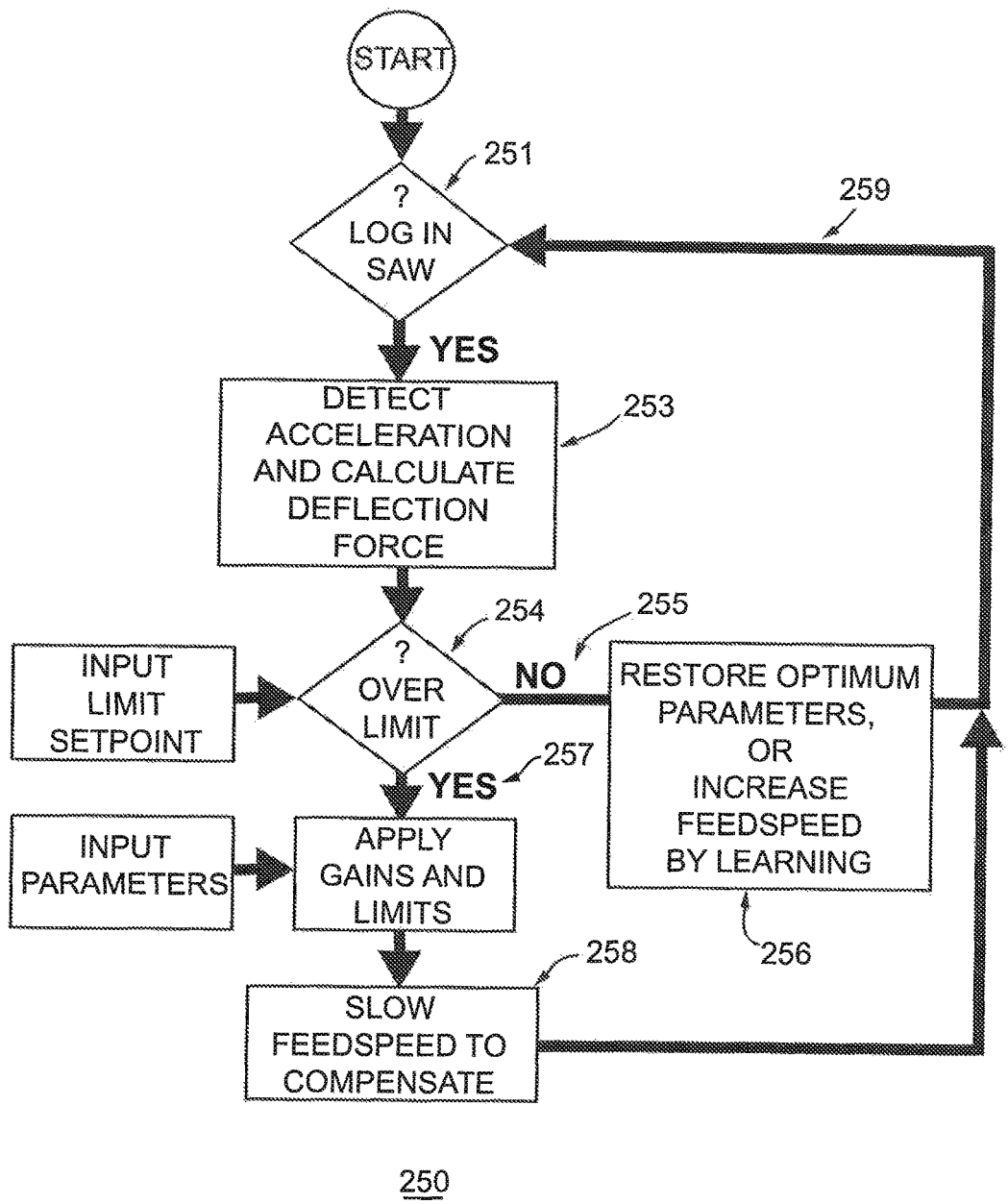
FIG. 13 is a schematic block diagram of components of a second software package used in non-contacting accelerometric sensor for an anti-deviation feedback control of feedspeed.

FIG. 13 is a schematic block diagram of components of a second software package used in accelerometric force sensing for an anti-deviation feedback control of feedspeed. The accelerometer is a piezoelectric sensor with accompanying converter package that outputs a 0 to 10 V signal and has a dynamic range of 10 gm or 50 gms. The pre-strain bias on the sawguide is about 100 lbs by comparison. The output signal can be converted to force using the relationship $F=ma$, which is displacement and position independent. Thus re-zeroing the sensor is not needed. But because the signal is dependent on acceleration, an integration is performed to provide a temporary displacement measurement and to track relaxation of the force measurement slot to its neutral position.

The flowchart is intended to show in general terms how a process control method is implemented, where the primary input 253 is a real time measurement of a force or pressure on a sawblade, the force measurement signal being used to sense and correct any incipient deviation from the ideal or "true" cut path through a workpiece, taking into account wood condition, mechanical factors in the saw and carriage, blade condition, and energy consumption.

Initially, the process logic will assess whether a log is in the saw ("?", 251). If not, the process ends until a log enters the mill feedpath. If YES, the process logic will monitor the electromechanical sensor input and assess any incipient deviation from a true cut 253 by detecting a change in lateral force of the blade against the bottom sawguide. The sawguide is positioned where deflection force on the blade starts at the exit from the cut.

The process logic is configured to enable a "force detection state" wherein the force measurement slot is elastically compressed or relaxed in real time according to a force associated with a lateral deflection on a pre-strained sawblade against or away from the front face of the sawguide during a cut and the electrical signal may range over a 10 V output to an anti-deviation controller.

The anti-deviation control logic is configured to receive a signal from the electromechanical sensor and to apply limits 254 to any absolute force change (to the left or right, or a tensioning of the blade due to sawing resistance). If the limit setpoint is not exceeded, a corrective adjustment 255 is made to increase workpiece feedspeed by issuing an instruction 256 that is processed by a motion controller. If the limit setpoint is exceeded 257, then the instruction 258 is to slow the feedspeed. The process then iterates 259 to assess the effect of the adjustment in real time.

When a true cut is restored, feedspeed may then be increased incrementally as long as the force limit is not exceeded. Ramping of feedspeed may be adjusted including using accelerometer sensing to prevent overcompensation in either slowing or accelerating the workpiece. This is a feedback loop and operates at a refresh rate dependent only on the clock rate of the processor. Suitable dampening coefficients are applied for PID control.

Restorative force is also sensed; as feedspeed slows, the blade will recover to a neutral true cut line as the excess spring force in the blade (and holder) is relaxed. This reverse force is also sensed as a restorative acceleration on the blade and may be integrated to reduce the integrated displacement for a return to zero of the steady state spring force.

Figure 14:
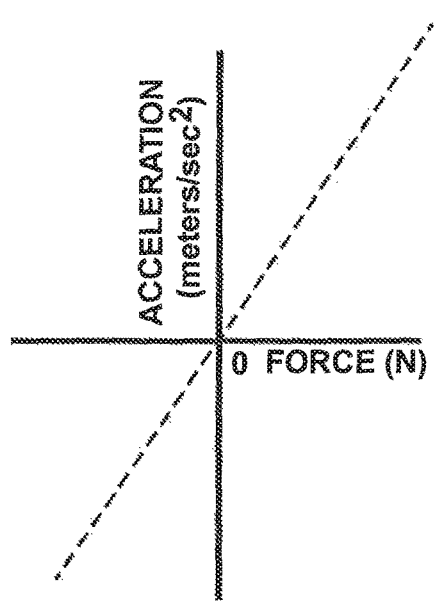
FIG. 14 shows the inherent zeroing capability of the accelerometric sensor. Any acceleration experienced by the sensor is converted to a voltage output in the solid state circuitry of the sensor package.

FIG. 14 shows the inherent zeroing capability of the accelerometer. Any acceleration experienced by the sensor is converted to a voltage output in the solid state circuitry of the sensor package. The accelerometry data is directional and may be outputted with a voltage polarity that corresponds to the direction of the blade force.

In yet another embodiment, MRU (motion reference unit including accelerometer and gyroscopic sensors) may be used. Multi-axial solid state inertial sensors have been developed for applications such as use in smart cellphones and respond to changes in the position and orientation of the cellphone. These units use the same MEMS technology for angular motion as the single axis accelerometers. Since the motion of the saw guide is restricted to one axis these devices are not necessary for the application of the invention.

Figure 15:
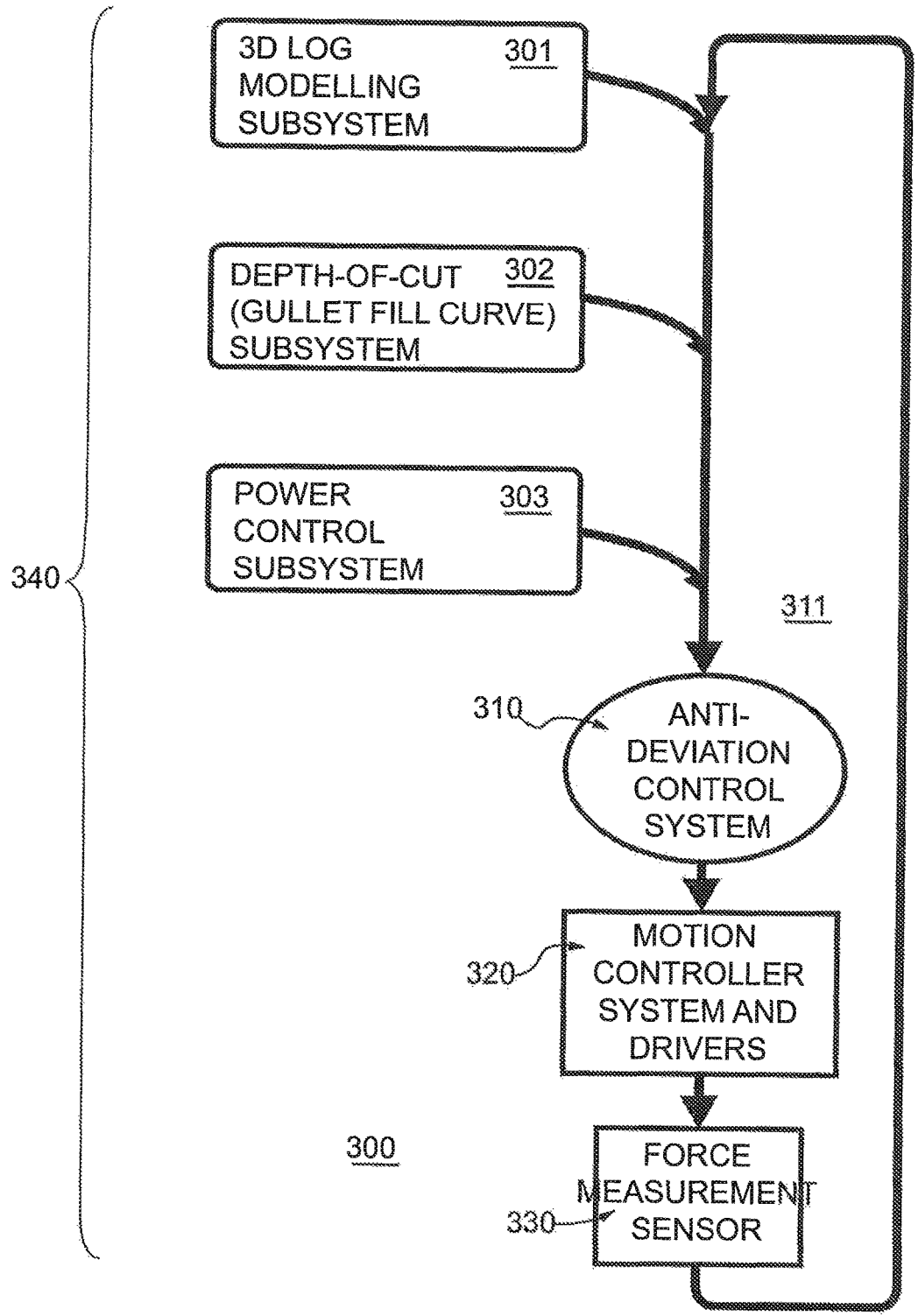
FIG. 15 is a block diagram showing functional blocks of a bandmill control system having an anti-deviation feedback control subsystem or function.

FIG. 15 is a block diagram showing functional blocks of a bandmill control system 300 having an anti-deviation feedback control subsystem or function. Master control system architecture is fundamentally altered by the capability to directly sense and essentially instantaneously reduce sawblade forces in a feedback loop by modifying output commands of the motion controller that drives the workpiece through the blade (or vice versa).

The electronics are described here schematically, and include an anti-deviation feedspeed controller circuit 310, with processor and non-volatile programmable logic, having an input from an electromechanical sensor 330 (loop, 311) coupled to a sawguide and an output to a motion controller 320 (such as a carriage drive or other log handling system). Generally the circuit operates as a digital circuit, and includes an A/D converter for digitizing sensor response. Advantageously, between each cut, the digitized input from the sensor may be saved as zero. Calibration of response slope may also be performed periodically. Safety features and overrides are typically engineered into the electronics or the programming.

The basic feedback loop includes an anti-deviation control system 310, a motion controller system 320, and a sawguide electromechanical sensor 330 operating as a real-time closed loop 311. The features of the invention are generally best implemented by a digital controller or computer having at least one processor, I/O functions, and at least one memory device enabled to execute non-volatile programmable instructions and receive feedback data. While conventional motion controllers may be used, integration of the anti-deviation feedback control systems of the invention may require modifications of the programming. Advantageously, an improved graphical user interface may be implemented with the new features, and data for serial log cuts may be analyzed to show increases in productivity as part of a quality improvement regimen.

In conjunction with the electromechanical sensor control, a number of complementary control features may be interacted, generally as a software package, to improve lumber production: these may include a log modeling control subsystem (301, for measuring log dimensions and taper, then projecting an optimized cut, including slew and skew cuts, through the saw based on fullest use of the log mass), a depth-of-cut control subsystem or function (302, typically with gullet fill curve calculation), and a saw power control subsystem or function (303, blade amperage operating cooperatively with feedspeed control). The components include program subroutines or functions and analog devices and are integrated in combination 340, each functional block processing realtime data and contributing to the optimized instructions executed under command of the motion controller subsystem 320.

Three-dimensional log modeling 301, depth-of-cut measurement (or calculation), gullet fill calculation 302, and power control 303 are practiced by a variety of methods known in the art. The improved feedspeed controller system achieved by using a sawguide electromechanical sensor operatively contacted to the sawblade as disclosed here is novel. Sensor guide force measured as the log exits the blade is synergic with and superior to the conventional methods of saw control and is used to reduce snaking and washboarding and to increase production. Electromechanical sensor control and motor power control are complementary because power control may be needed for example to prevent overpower in dense wood, even when a true cut is maintained. Many conventional saws rely on constant RPM control for saw speed and will increase amperage to an upper limit when increased resistance is encountered. Output of the system(s) is generally in the form of an instruction to a motion controller circuit 320 that is wired to a log mover, drive wheel power, and may also control top guide holder position, for example.

Gullet fill curves are typically calculated by measuring depth-of-cut or are modeled from three-dimensional log models. Gullet overfill is likely to promote deviation and is conventionally controlled by a calculation based on log modeling, depth-of-cut, and/or operator experience. In contrast, electromechanical sensor control is based on an actual measurement and rapidly responds to gullet overfill by detecting forces that result in deviation. As wood spills out of the gullet in the cut, it tends to push the blade to one side or another and can be detected by an electromechanical sensor in real time as described here.

Gullet fill may be controlled using a calculated value or a "blind cut", but electromechanical sensor control of the invention is a direct measurement of gullet fill and is an advance in the art. Depth of cut and log modeling are still used to position the top sawguide for maximally supporting the blade during a cut and for sizing up the log shape and planning the cut cross-sections so as to maximize the lumber yield.

Integrations 340 of the inventive systems and methods include control systems and software having combinations of guide electromechanical sensor control and one or more of log modeling, gullet fill, and power control functions. Log modeling, depth of cut and gullet fill functions may be used individually on a machine, or may be used in integrated combinations. Methods of optimizing sawmill operation will benefit from a combination of operational controls, which may be superimposed as separate functional subsystems or layers, or integrated into a single functional system with feedback control if desired. Generally the control system includes monitoring and display functions to assist an operator and management in assessing performance and scheduling maintenance tasks such as changing of a sawblade or trueing the guide faces.

Further refinement may be achieved by adjustment of motion control parameters, wood parameters, and PID control parameters. The feedback loop may include subroutines, such as a subroutine for dampening hysteresis and another subroutine for starting and stopping a cut, or for displaying alerts to an operator, such as an alert to schedule a blade change. Also useful are emergency shutdown routines, such as for a jam or break condition of a blade due to log slippage.

Improvement is also possible by implementing "smart" routines that include machine learning. The ideal saw feedspeed is the speed at which an optimum percent gullet fill is achieved. When the gullet of a sawblade is overfilled, the chips will be forced out the side of the gullet, causing the saw to start deviating laterally from its path. An ideal gullet fill will change with wood species, dryness, saw shape and saw condition, all of which affect the way the wood chips pack into the gullet. The system of this invention may be implemented to learn and adapt to these conditions by early sensing of saw deviation and by correlation of log parameters and conditions of operation, for example.

According to another embodiment of the invention, the gullet fill constant is established first by setting a starting default or baseline speed for a reference depth-of-cut and sawguide pressure or force. The learning algorithm then adjusts the reference speed according to the force sensing signal, decreasing the reference speed because of excessive force or increasing it because of no force. The system speed will learn with each log at an adjustable rate. As a supplemental data input, for example, cutting depth measurements may be taken at a defined incremental distance along the log as known in the art, for example with reference to U.S. Pat. No. 6,681,672 to Myrfield, co-owned by the inventor.

Each log has a unique taper, length, grain structure, wetness and density, all of which impact forces on the sawblade in the cut. Therefore, for the automated systems 340, each cut is a signature cut unique to a particular log. Fully automated cut signatures may be seen on an integrated display, one after another in an extended series with no interruptions or uneven cuts. Because excessive force on any blade is instantly corrected, overfeeding is consistently reduced, leading to increases in productivity, more consistent feedspeed, and better control of product tolerances (more efficient use of each log).

A bar graph quantitates the overall efficiency and gains in production throughput achieved by implementing electromechanical sensors on the blade guides. Baseline performance by a conventional or manually-operated system consistently underperforms systems with guide electromechanical sensor control and feedback of the invention. Using only a negative feedback control loop to prevent deviation, these gains are substantial in actual production. But use of positive feedspeed control is also possible, and results in further gains in throughput and productivity without sacrifice of lumber size control target.

Figure 16:
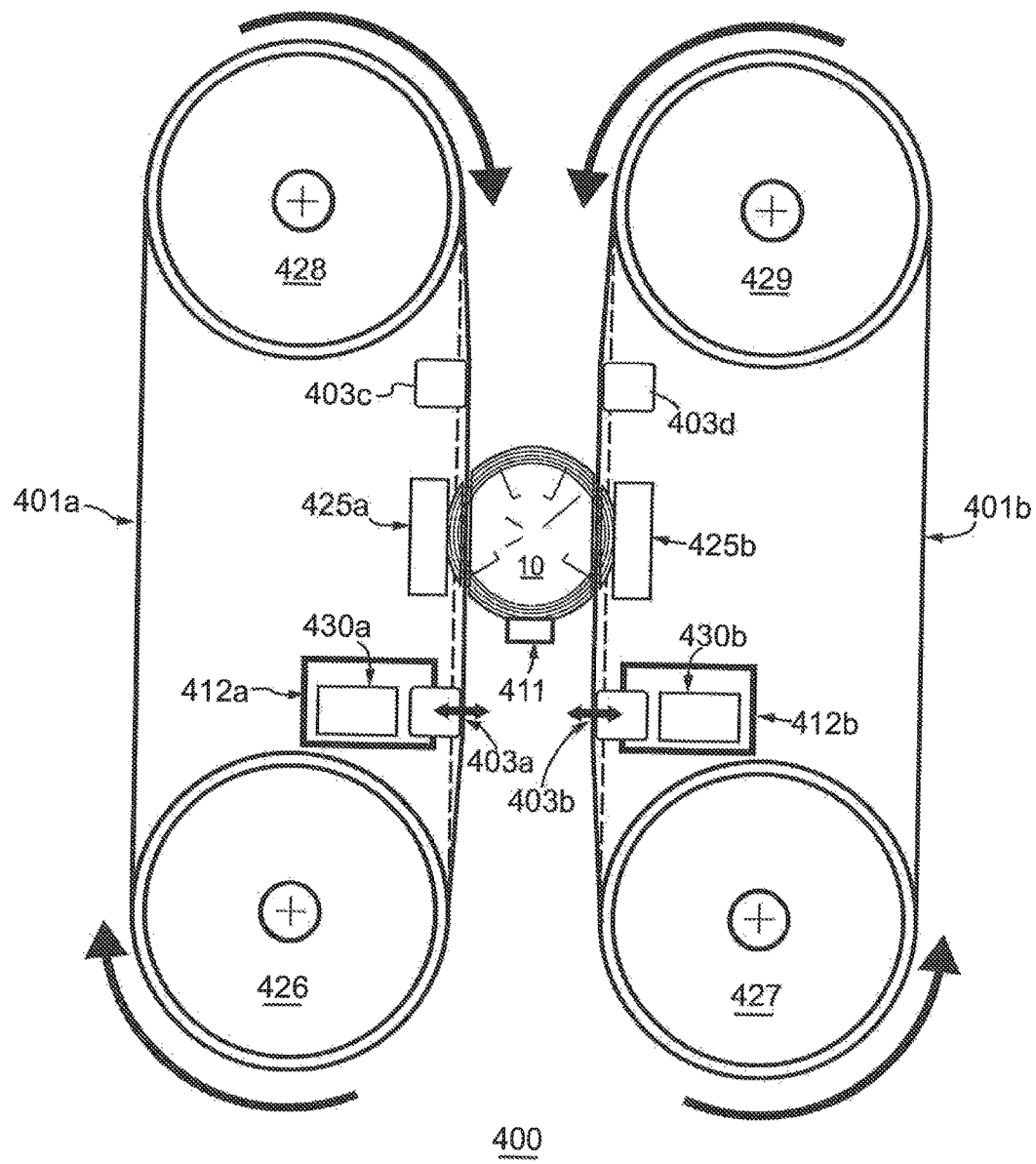
FIG. 16 is a schematic representation of a twin bandmill having two sawblades operating side by side, each bandmill having non-contacting guide pressure sensing with coordinated feedspeed control.

FIG. 16 is a schematic representation of an industrial twin bandmill 400 having two sawblades (401a, 401b) operating together on a single workpiece 10, each sawblade having a bottom sawguide electromechanical sensor unit. Each blade is pre-tensioned between top (403c, 403d) and bottom sawguides (403a, 403b) by adjusting the sawguides relative to a plumb line connecting the drive and idler wheels (426, 427, 428, 429), which spin so that the blades are counter-rotating. Each sawguide is mounted in a guide holder assembly (312a, 312b). Each sawguide is mounted in a guide holder assembly (402a, 402b). The two electromechanical sensors (430a, 430b) are typically electronically coupled to a single feedspeed controller. The workpiece is moved between the blades on a motorized chain drive 411 having log press rollers (425a, 425b) mounted on either side. The press roll motors and chain drive are configured to provide clearance for the blades, and may be adjusted so as to provide the desired width of cut. Stock is typically run through a side chipper to prepare side faces that have been smoothed and squared prior to being fed into the press rollers. Other carriage mechanisms for conveying a workpiece through a bandsaw may be controlled by a motion controller equipped with an anti-deviation feedspeed control system and the electromechanical sensors of the invention.

Feedspeed of the workpiece is reduced if the force of either of the two blades exceeds a preset limit. Each sensor operates independently on a single sawblade, but the feed motion controller circuit is configured to always respond to the cut on the side that has the highest absolute guide force at any instant. Conversely, the feedspeed may be coordinately increased for both sawblades to a point of "incipient deviation" according to the teachings of my invention such that feedspeed is neither underfed nor overfed according to the grain density and wetness of the wood, the depth of cut, the saw tooth condition, and so forth.

While not shown, one skilled in the art will recognize that quad bandsaws may be operated using four electromechanical sensors and that the controller circuitry of the invention may be readily modified to include four inputs, and so forth. Each sensor output is independent, but is processed to control workpiece feedspeed according to coordinated instructions. Typically, for multi-blade operation, a force will be calculated that allows for adjustment of workpiece feedspeed based on the greatest force on any one of the blades at any particular moment in time. Blades operated serially may also be controlled by an electromechanical sensor feedback control system of my invention. Cuts may be end-to-end cuts, rip cuts, or crosscuts, for example.

Figure 17:
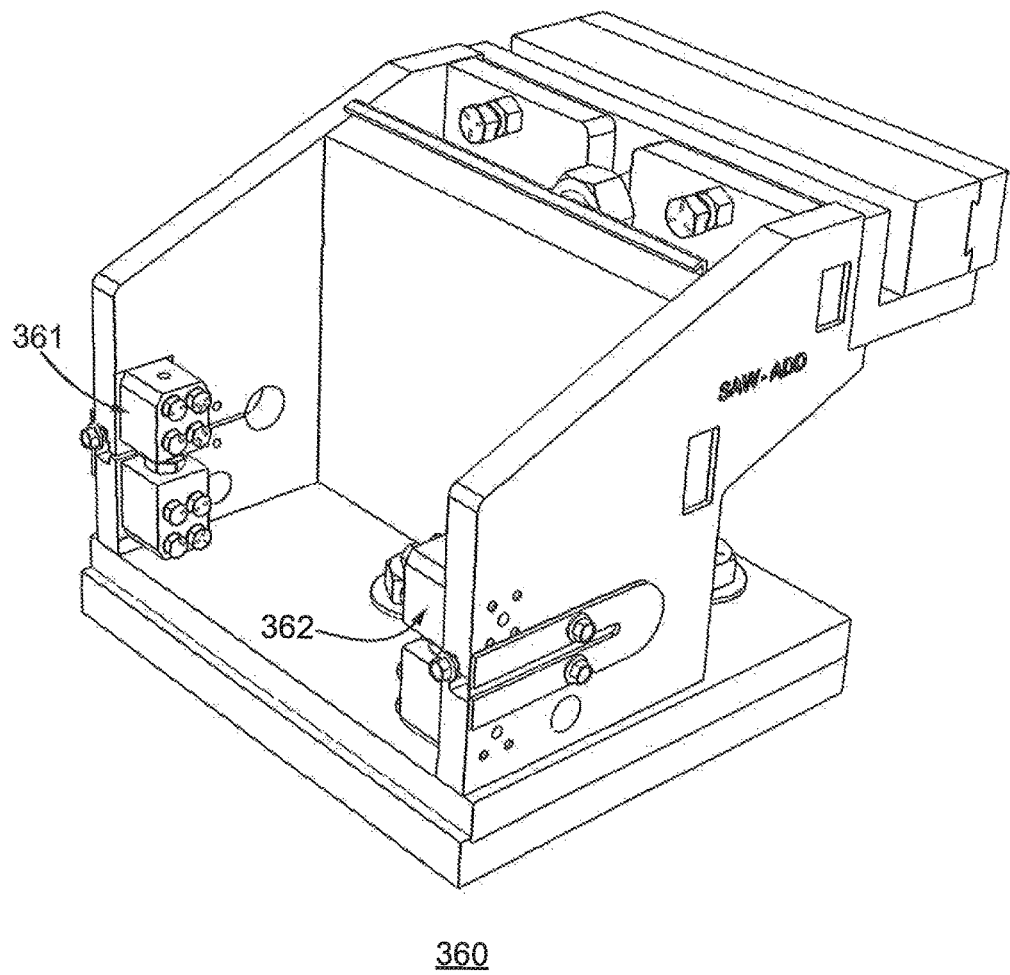
FIG. 17 is a perspective view of a sawguide with guide holder, the guide holder having two symmetrical force measurement slots and electromechanical sensors, one on each of the supporting lateral walls.

FIG. 17 is a perspective view of a sawguide with guide holder 360, the guide holder having two paired symmetrical force measurement slots, contralaterally disposed on the frame of the guide holder, and associated force transducer assemblies with electromechanical sensors, one on each of the supporting lateral walls. The advantages of the two sensors are: a) a more accurate measurement of the initial saw strain can be achieved; b) the consistency of the saws, including the saw tire lines can be measured; c) the sum of the two force measurements will provide a more accurate indication of the power applied to the bandsaw during sawing; d) the differential between the forces on the front and the rear of the bandsaw measurements will provide an earlier indication of the incipient deviation away from the guide (the force from sawing power, will be shifted to the rear sensor when a force on the front sensor from incipient deviation is away from the guide); e) the sawing power will be distinguishable from the deviating forces so that limits can be set closer and even separate limits for power and sawing deflection forces; and, f) runtime monitoring of the saw strain will provide an early indication when a tire line has been weakened from overheating or over stressing of the saw. Both units are functional and it became desirable to offer as an upgrade when the low maintenance of the sensors was revealed, but surprisingly, the paired.transducers offer the opportunity to extract saw resistance, and thus power, from the sensor response.

Regarding power control, using the dual sensor systems depicted in FIG. 17, the system of the invention is able to provide resistance measurements in real time at the sawcut by measuring the sum of the forces with a sensor at the front of the blade and another sensor at the back of the blade, then subtracting out the differential of the two sensors, from which sawing power can be calculated by a process controller.

Feedspeed and throughput control systems employing dual force measurement slots are also disclosed, the systems as described above, and further comprising a) a guide holder having a pair of force measurement slots disposed contralaterally on the frame, one proximate to a leading end of the sawguide, the other proximate to a trailing end of the sawguide, wherein each the force measurement slot is configured to flex at each the flexural hinge independently or conjointly in response to deflection forces (lateral and torsional) and saw resistance forces on the sawguide; and, b) a pair of electromechanical sensors, wherein each the electromechanical sensor is mounted to straddle or seat on the force measurement slot so as to measure the deflection forces (lateral and torsional) and saw resistance forces on the sawguide and output a raw signal to a processor, the processor having the capacity to derive the sum and difference of the electromechanical sensors individually. The bandsaw feedspeed and throughput control system may include an anti-deviation control circuit for receiving the signal from the electromechanical sensor as part of process feedback control of workpiece feedspeed. The feedspeed and throughput control system may include a motion control circuit operative configured to drive a reciprocating carriage, an end-dogging carriage, a sharp chain, a motorized press roll assembly, or a combination thereof as part of a process feedback control of workpiece feedspeed.

Also disclosed are feedspeed and throughput control system for improving lumber size control in a bandsaw, which comprise a guide holder with frame for supporting a bottom sawguide, the frame comprising a force sensing device having a pair of force measurement slots each in combination with an electromechanical sensor straddling, seated, or disposed thereon, wherein each electromechanical sensor is configured to measure displacement at the force measurement slot coupled to deformation of the guide holder in response to a deflection forces (lateral and torsional) or saw resistance force of a bandsaw blade in contact with the bottom sawguide.

Also disclosed are methods. As a general statement of principle, the invention includes methods for cutting a workpiece with a bandmill, the bandmill having a sawblade, a top sawguide and a bottom sawguide, each sawguide having a front face enabled to contact and pre-strain the sawblade during a cut through a workpiece, a motion controller and a drive mechanism for controlling workpiece feedspeed, where the method is characterized by: (a) providing an anti-deviation controller to an operator of a bandmill, the anti-deviation controller comprising: i) a non-contacting force sensing system operatively coupled to the bottom sawguide such that the electromechanical sensor is enabled to sense a displacement or motion associated with an incipient lateral deviation of the pre-strained sawblade against or away from the front face of the bottom sawguide during a cut and to output an electrical signal indicative of a magnitude and a direction of the incipient lateral deviation from a true cut line, ii) an anti-deviation control system configured to receive the electrical signal from the electromechanical sensor, to calculate a magnitude and a direction in real time of a force on the blade, then to calculate a feedspeed adjustment output therefrom, and iii) a motion controller system enabled to receive the feedspeed adjustment output from the anti-deviation control system and to operate the drive mechanism by making an adjustment in workpiece feedspeed in response thereto; (b) pre-straining the sawblade by laterally biasing the bottom sawguide against the sawblade; and, (c) while cutting a workpiece, monitoring the electrical signal from the electromechanical sensor and operating the drive mechanism under control of the anti-deviation control system so as to counter any lateral deflection of the sawblade from a true cut line, thereby operating an anti-deviation feedback control loop. A force measurement slot is engineered in the guide holder so as to concentrate a force differential on the electromechanical sensor.

The step for pre-straining a bandsaw sawblade has two components: a) applying a larger tensioning push on a center axle of an idler wheel and a center axle of a drive wheel of the bandmill (the idler wheel and drive wheel having the bandsaw sawblade looped thereacross) and b) then applying a smaller lateral push on the top sawguide and the bottom sawguide against the sawblade so as to displace the sawblade paralleledly out of plumb with a tangent line connecting the outside edges of the wheels. The electromechanical sensor is then biased near the middle of its dynamic range so as to generate an electrical signal from the electromechanical sensor even when the sawblade is at rest.

The method of any of above disclosures may further comprise steps for a) providing a guide holder having a pair of force measurement slots disposed contralaterally on the frame, one proximate to a leading end of the sawguide, the other proximate to a trailing end of the sawguide, wherein each force measurement slot is configured to flex at each of the flexural hinges independently or conjointly in response to lateral deflection forces, torsional deflection forces, and/or saw resistance forces on the sawguide; b) providing a pair of electromechanical sensors, wherein each of the electromechanical sensors are mounted to straddle or seat on one force measurement slot so as to measure the lateral deflection forces, torsional deflection forces, and/or saw resistance forces on the sawguide and output a signal to a processor, the processor having the capacity to derive a sum and a difference of the electromechanical sensor signal outputs in combination; c) providing an anti-deviation controller, wherein the anti-deviation controller is configured with processor and memory for receiving a combined signal from the electromechanical sensors, wherein the anti-deviation controller includes a processor with instructions configured for analyzing the combined signal from the electromechanical sensors for any lateral deflection forces and torsional deflection forces, and/or saw resistance force components on the sawguide and for outputting an anti-deviation solution to a motion controller; and, d) providing a motion controller with processor and memory configured to receive the anti-deviation solution and execute motion control commands to a bandsaw driver. These and other variations are evident in FIG. 17 when taken in combination with the preceding disclosures made herein.

The anti-deviation control system is further configured to digitally zero the electrical signal between cuts, such that a positive value of the electrical signal during a cut is associated with a lateral deflection force on the sawblade in a first direction and a negative value is associated with a lateral deflection force on the sawblade in an opposite direction. Optionally an absolute value of the signal may be used in controlling feedspeed adjustment.

Thus the method involves detection of the deflections force on the sawblade dynamically in real time by operating the electromechanical sensor in two process states: a) a "zero set state" wherein the electromechanical sensor is displaced by statically pre-straining the sawguide against the sawblade, followed by zeroing the resultant electrical signal in supporting circuitry or software; and b) a "force detection state" wherein electromechanical sensor is elastically displaced during a cut by any lateral deflection force on the sawblade against or away from the sawguide such that the electrical signal may range from zero to a non-zero value.

FIG. 18A is a perspective view of a low profile anti-deviation bottom guide holder and sensor assembly 370 having anterior and posterior slots (375a,376) defining a flexural member or flexure hinge (377) between the strain relief cutouts (375c,376a) of the two slots. Anteriolateral slots (375a,375b) and posteriolateral slots 376 (termed here a "keyway slot") define flexural hinge member 377. However, flexion is restricted to the anterior slot in major part; the keyway is precision machined and is occupied by key 379. Machine key 379 is used as a precision travel limit stop in the posterior slot to provide protection for flexural hinge member 377 from being flexed beyond the FOS elastic limit. In the exemplary build shown, also supported by the guide holder is a force transducer assembly 373 with non-contacting sensor, as may be any one of the previously discussed family of electromechanical sensors, including non-contacting sensors selected from eddy current, capacitive, or accelerometric sensors. This design is advantageously employed, for example, when the vertical clearance at the front of the guide holder is necessarily low. Sawdust slot covers 378 and a front cover (not shown) may be included as needed. Electrical connections and components of a feedback loop are not shown here, but are described in the following figure. As deflection forces are encountered, the system anticipates deviation from a true cut condition. Sawblade 1 contacts the sawguide front face, such that the guide holder is designed to flex in the flexural hinge region 373 with forces on the sawguide. Any incipient deviation actuates an output from sensor 373 that is conveyed to a process controller, where a corrective response is generated as shown in FIG. 18B and in exemplary process flowcharts of FIG. 9 and FIG. 13, completing an anti-deviation process feedback loop in response to a force measurement indirectly coupled to the force at the point of incipient deviation, where "incipient" indicates that cutting deflection forces are sensed prior to deviation from a true cut condition.

Figure 18B:
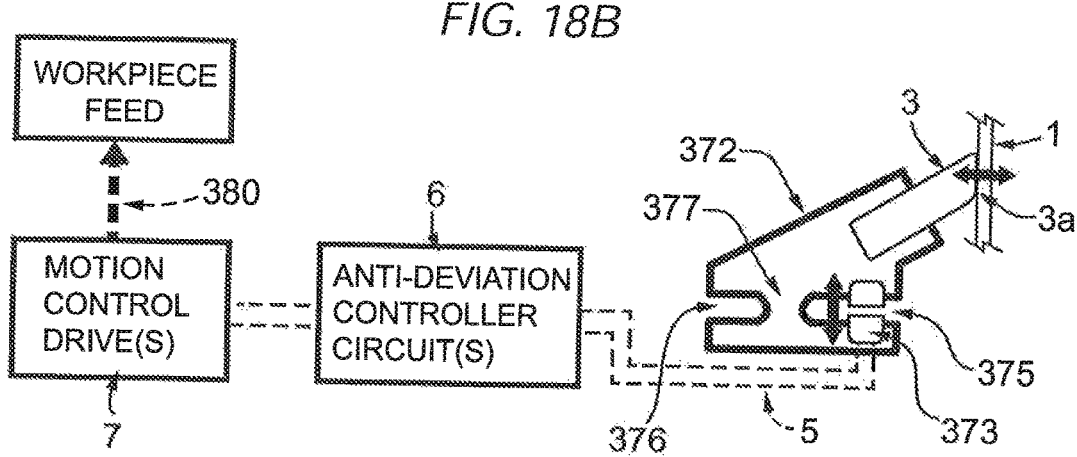
FIG. 18B is a schematic view of a process feedback control system based on the assembly of FIG. 18A and complements those shown in FIGS. 4A-4D.

FIG. 18B is a schematic or block diagram of another force sensing system representative of the family of bandsaw process control loops disclosed here and is comparable to FIGS. 4A-4C. The figure is exemplary of a force sensing system having a force measurement slot 375 and force transducer assembly 373 with sensor mounted on an interior face thereon. The frame is enabled to flex in a flexural hinge region 377, thus allowing the force measurement slot to open or close in response to forces on sawguide 3. Various electromechanical sensors may be used. Whereas a strain gauge is part of a mechanical stack across the force measurement slot, capacitive and eddy current sensor systems are proximity sensors and are non-contacting. Similarly, an accelerometer does not mechanically oppose deformation at the hinge of the slot, as was demonstrated earlier.

As can be seen, downstream process control circuitry and process software are generally analogous to those elements described with respect to FIGS. 4A, 4B, 4C and 4D. These exemplary systems use a functional block represented as "anti-deviation control circuits" (6) and another functional block represented as "motion control drive(s)" (7) that coordinate motor and actuation functions of the bandsaw feed drives. The anti-deviation control circuits are configured to receive a signal 5 from electromechanical sensor (373), and to interpret that signal as a force vector with magnitude and direction so as to output commands to the motion control drive or drives that will reduce or counter any forces that would cause deflection or deviation from the true cut line. Motion commands (dashed arrow) are typically given with continuous feedspeeds (velocity) until a change in feedspeed is commanded 380, or in a motion profile with a start point and an end point with an acceleration velocity, and deceleration parameter defined for the motion profile with velocity changes issued. The system is configured to do rapid iterations so that the motion control adjustments are made in essentially real time. Blade power may also be controlled from the force measurement.

EXAMPLE 1

Experience has showed that non-contacting linkages are more robust and are as sensitive as strain gauges when used to measure forces at a bottom sawguide. Particulates and other interferences have not been problematic with an eddy current sensor. Coupling using a non-contacting eddy current electromechanical sensor has produced a better result in transduction of any force on the sawguide to a change in displacement of the electromechanical sensor relative to a target, with a resultant reproducible electrical signal output.

INCORPORATION BY REFERENCE

All of the U.S. Patents, U.S. Patent application publications, U.S. Patent applications, foreign patents, foreign patent applications and non-patent publications referred to in this specification and related filings are incorporated herein by reference in their entirety for all purposes.

Scope of the Claims

The disclosure set forth herein of certain exemplary embodiments, including all text, drawings, annotations, and graphs, is sufficient to enable one of ordinary skill in the art to practice the invention. Various alternatives, modifications and equivalents are possible, as will readily occur to those skilled in the art in practice of the invention. The inventions, examples, and embodiments described herein are not limited to particularly exemplified materials, methods, and/or structures and various changes may be made in the size, shape, type, number and arrangement of parts described herein. All embodiments, alternatives, modifications and equivalents may be combined to provide further embodiments of the present invention without departing from the true spirit and scope of the invention.

Moreover, although wood is a preferred workpiece, the system may be utilized for cutting a variety of objects other than logs. Thus, it may be utilized in the cutting of cants and dimensioned lumber, and the cutting of plastic, ceramic or metal, for example. Although the system as described herein is associated with a bandmill, it also may be used with industrial circular saws, for example, by installing guide-blocks with electromechanical sensors on a circular sawblade beneath a workpiece. These and other changes may be made without departing from the spirit and scope of this invention and the spirit and scope of any claims thereto.

In general, in the following claims, the terms used in the written description should not be construed to limit the claims to specific embodiments described herein for illustration, but should be construed to include all possible embodiments, both specific and generic, along with the full scope of equivalents to which such claims are entitled. Accordingly, the claims are not limited in haec verba by the disclosure.

I claim:

1. A bandsaw process control system comprising:
a bandsaw;
a sawguide adapted for coupling to the bandsaw and configured to contact a broad side of a blade of the bandsaw between a workpiece and a drive wheel of the bandsaw, said contact to cause a prestraining force between the broad side of the blade and the sawguide, wherein the sawguide comprises a force measurement slot whose width varies proportionally to a dynamically-varying force perpendicular to the broad side of the blade and the sawguide;
a non-contacting electromechanical sensor spanning the force measurement slot to measure the dynamically-varying force between the broad side of the blade and the sawguide, said noncontacting electromechanical sensor outputting a signal proportional to such dynamically-varying force; and
an anti-deviation feedback control package to receive the signal and to adjust a bandsaw process control variable proportionally to the signal.

2. The bandsaw process control system of claim 1 wherein the sawguide has a bottom sawguide support having a weakened area that deforms in response to the force exerted by the broad side of the bandsaw blade.

3. The bandsaw process control system of claim 2 wherein the weakened area is a force measurement slot in a sidewall of the bottom sawguide support.

4. The bandsaw process control system of claim 3 wherein the measurement span extends across the force measurement slot.

5. The bandsaw process control system of claim 1 wherein the non-contacting electromechanical sensor is a capacitive sensor.

6. The bandsaw process control system of claim 1 wherein the bandsaw process control variable is a workpiece feed speed.

7. The bandsaw process control system of claim 1 wherein the force is caused by a lateral or torsional workpiece deflecting dynamic force on the saw blade, or a workpiece-resistance-induced tension of the saw blade.

8. The bandsaw process control system of claim 1 wherein the non-contacting electromechanical sensor is an eddy current sensor.

9. The bandsaw process control system of claim 1 wherein the non-contacting electromechanical sensor is an accelerometer.

10. The bandsaw process control system of claim 1 wherein the anti-deviation feedback control package is a PID controller.

* * * * *